US009256219B2

(12) United States Patent
Blevins et al.

(10) Patent No.: US 9,256,219 B2
(45) Date of Patent: Feb. 9, 2016

(54) SYSTEM CONFIGURATION USING TEMPLATES

(75) Inventors: Terrence L. Blevins, Round Rock, TX (US); John M. Lucas, Leicester (GB); Mark J. Nixon, Round Rock, TX (US); Stephen C. Gilbert, Austin, TX (US); Alper T. Enver, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 529 days.

(21) Appl. No.: 12/539,399

(22) Filed: Aug. 11, 2009

(65) Prior Publication Data

US 2011/0040390 A1    Feb. 17, 2011

(51) Int. Cl.
G05B 19/042    (2006.01)

(52) U.S. Cl.
CPC ................... *G05B 19/0426* (2013.01)

(58) Field of Classification Search
CPC .... G05B 19/0426; G05B 19/02; G05B 19/04; G05B 19/041; G05B 19/0423; G05B 19/045; G05B 19/056
USPC ......................................... 700/17, 83, 86, 87
See application file for complete search history.

(56) References Cited

U.S. PATENT DOCUMENTS

| 6,445,963 | B1 | 9/2002 | Blevins et al. |
| 6,510,351 | B1 | 1/2003 | Blevins et al. |
| 6,618,630 | B1 | 9/2003 | Jundt et al. |
| 6,862,553 | B2 * | 3/2005 | Schwenke et al. ............ 702/183 |
| 7,117,052 | B2 | 10/2006 | Lucas et al. |
| 7,474,929 | B2 | 1/2009 | Nixon et al. |
| 7,515,977 | B2 | 4/2009 | Eryurek et al. |
| 7,848,829 | B2 | 12/2010 | Nixon et al. |
| 2004/0073404 | A1 * | 4/2004 | Brooks et al. ................. 702/183 |
| 2005/0027377 | A1 * | 2/2005 | Lucas et al. ..................... 700/28 |
| 2005/0222698 | A1 * | 10/2005 | Eryurek et al. ................. 700/90 |
| 2007/0093917 | A1 | 4/2007 | Steinman |
| 2007/0168060 | A1 * | 7/2007 | Nixon et al. .................... 700/83 |
| 2007/0179645 | A1 | 8/2007 | Nixon et al. |

(Continued)

FOREIGN PATENT DOCUMENTS

| JP | 62-224825 | 10/1987 |
| JP | 05-100832 | 4/1993 |

(Continued)

OTHER PUBLICATIONS

Brochure, "Emerson Project Services; When Success is the Only Option," Emerson Process Management, pp. 1-20 (2003).

(Continued)

*Primary Examiner* — Mohammad Ali
*Assistant Examiner* — Nathan L Laughlin
(74) *Attorney, Agent, or Firm* — Marshall, Gerstein & Borun LLP

(57) ABSTRACT

A method in a computer system for developing a process control strategy includes providing a module template having a first plurality of components and being associated with a control operation, receiving a selection of one or more of the first plurality of components of the module template, generating an instance of a module based on the module template, including instantiating only the selected one or more of the first plurality of components, and associating the generated instance of the module with the process control strategy.

37 Claims, 14 Drawing Sheets

(56) References Cited

U.S. PATENT DOCUMENTS

2008/0097630 A1    4/2008  Weatherhead et al.
2008/0188960 A1*   8/2008  Nixon et al. .................... 700/86

FOREIGN PATENT DOCUMENTS

JP    2005-339494 A    12/2005
WO   WO-95/04314 A1    2/1995

OTHER PUBLICATIONS

Emerson Process Management, "DeltaV Books Online 9.3," Copyright © 1994-2007. Retrieved from the Internet on Sep. 2, 2010: URL::http.easydeltav.com/bol/MasterBOL.htm.

Search Report for Application No. GB1012731.4, dated Nov. 26, 2010.
Notice of Reasons for Rejection for Japanese Application No. 2010-170285, dated May 7, 2014.
Chinese Office Action for Application No. 201010251609.8, dated Jan. 6, 2014.
English translation of Chinese Office Action for Application No. 201010251609.8, dated Jan. 6, 2014.
English translation of Chinese Office Action for Application No. 201010251609.8, mailed Feb. 28, 2015.
English translation of Chinese Office Action for Application No. 201010251609.8, mailed Sep. 3, 2014.
Examination Report for Great Britain Patent Application No. GB1012731.4, dated Mar. 13, 2015.

\* cited by examiner

SYSTEM CONFIGURATION USING TEMPLATES

FIELD OF THE INVENTION

The present disclosure relates generally to process control systems and, in particular, to providing efficient configuration of such systems.

TECHNICAL BACKGROUND

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, and uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Fisher Rosemount Systems, Inc., headquartered in Austin, Tex., use function blocks or groups of function blocks referred to as modules located in the controller and/or in field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-derivative-integral (PID) control routine. The different function blocks and modules within a process control system are generally configured to communicate with each other (e.g., over a bus) to form one or more process control loops.

In some cases, function blocks may be consistent with, or similar to, the standard promulgated by Foundation™ Fieldbus. However, the term "function block" as used herein is not limited to what the DeltaV or the Fieldbus protocols identify as a function block but, instead, includes any other type of block, program, hardware, firmware, etc., associated with any type of control system and/or communication protocol and that can be used to implement some control function. Moreover, the term "function block" as used herein may generally refer to a function block that encapsulates one or several control functions, a resource block that includes one or more process parameters, a transducer block that corresponds to an interface to a sensor (e.g., temperature sensor, pressure sensor, etc.), a flowmeter, a valve actuator, etc., or any other type of block. Further, function blocks may refer to basic function blocks such as Discrete Input (DI), Discrete Output (DO), Analog Input (AO), Analog Output (AO), PID control, PD control, PI control, P control, Control Selector, Bias/Gain Station, etc., as well as to advanced function blocks such as Setpoint Ramp Generator, Timer, Analog Alarm, Discrete Alarm, Deadtime, etc. Still further, function block as used herein may be a nested block that includes several Fieldbus function blocks, for example, or even one or several nested blocks. It will be also noted that while function blocks typically take the form of objects within an object-oriented programming environment, function blocks generally can be defined using any desired data structure in any suitable software environment.

Thus, process controllers are typically programmed to execute a different algorithm, sub-routine or control loop (which are all control routines) for each of a number of different loops defined for, or contained within a process, such as flow control loops, temperature control loops, pressure control loops, etc. As indicated above, each such control loop includes one or more input blocks, such as an analog input (AI) function block, a single-output control block, such as a proportional-integral-derivative (PID) or a fuzzy logic control function block, and an output block, such as an analog output (AO) function block.

Control routines, and the function blocks that implement such routines, are configured in accordance with a number of control techniques, including PID control, fuzzy logic control, and model-based techniques such as a Smith Predictor or Model Predictive control (MPC). In model-based control techniques, the parameters used in the routines to determine the closed loop control response are based on the dynamic process response to changes in the manipulated or measured disturbances serving as inputs to the process. A representation of this response of the process to changes in process inputs may be characterized as a process model. For instance, a first-order parameterized process model may specify values for the gain, dead time, and time constant of the process.

In a typical plant, an engineer may define and configure the process control strategy using a configuration system that runs on an operator workstation. Some configuration systems may include a library to store control elements such as function blocks or modules (typically made up of a number of function blocks), so that the engineer can select and generate an instance of a selected control element according to a particular application. The configuration system may also allow the engineer to modify to alter the generated instance of the selected control element before applying the instance to the process control environment by, for example, downloading the control element to a controller or a programmable field device.

For example, a template library in a DeltaV system stores various module templates that address basic measurement and control functionality. Templates in DeltaV can be autonomous or class-based (i.e., linked to instances instantiated from the class template and capable of propagating changes in the class template to the instances). An engineer will often use one or several module templates as a starting point in defining and configuring the corresponding process control scheme. However, because typical modifications to the module templates involve a significant engineering effort and require certain check-in, check-out, and documentation procedures, working with the template library may be time-consuming.

To simplify the task of configuring a process control system, Emerson™ Process Management developed a collection of comprehensive reusable module templates and module classes known as the Project Builder Library (PBL). Generally, module templates in the PBL address the broadest contemplated range of configuration options and scenarios applicable to a particular module. The engineers who contribute to PBL build upon international standards such as ISA S88.0, IEC 61508, IEC 61131-3, etc. and incorporate experience and best practices from many hours of application and project engineering. Using PBL, an engineer can select a module template, modify values of module parameters to enable and configure the desired features, and disable the features unnecessary for the particular application. For example, a certain template may allow eight possible inputs into a certain function block, and may accordingly include eight input blocks corresponding to these eight inputs. A user who needs only one of these inputs could effectively disable seven of the eight inputs by assigning the value FALSE to the corresponding parameters. A typical PBL template thus includes more features than a DeltaV library module defined for a similar purpose. For example, a PBL template for Continuous Control may include all the features of the corresponding DeltaV template, as well as additional features related to equipment arbitration, support for four track inputs with enable/disable capability and first out detection, conditional alarming with enable/disable capability and operator access, controls to set the status of RCAS_IN and ROUT_IN channels, mode locking to optionally prevent operators from accessing the module, a failure parameter, etc. In short, a PBL module template is likely to include all the functionality of a module an engineer may need for a particular project, and to use the module the engineer normally must change only some or all values of module parameters.

While PBL can significantly simplify the process of configuring process control, PBL module templates unfortunately require a relatively large amount of controller memory. In particular, because engineers customize module templates by modifying module parameters, each instance inherits all function blocks from the parent module template, along with the associated parameters, regardless of whether a particular function block is operative in the instance. Moreover, PBL templates do not always provide the "what you see is what you can have" user experience because each module instance retains the entire functionality of the corresponding PBL module template, and engineers must examine many parameters to determine which function blocks and parameters are actually in use.

SUMMARY

A module template for use in process control configuration includes one or several selectable components such as logic or function blocks and process parameters. When designing a process control scheme, an operator may select a module template for a particular application, select the desired components within the module template, and create a module instance that includes only the selected components. The operator may thus customize both the structure of the module instance and the parameters corresponding to the components of the module instance. In some embodiments, the module template additionally includes one or several non-optional components, and each module instance created using the module template accordingly includes each of the non-optional components regardless of the optional configuration of the module instance, and the optional components selected by the user. Optionally, a module instance also includes a parent template identifier to identify a module template from which the module instance was generated, i.e., the "parent" template. As another option, the module instance may include a data field to specify which of the options available in the parent module template were selected at the instantiation of the module instance. In some embodiments, an operator may modify the module instance after the module instance has been instantiated. In at least some of these embodiments, the operator may unselect some of the previously selected optional components and/or select the previously unselected optional components.

In another aspect, a software environment for configuring a process control system includes a user interface for defining a module template, identifying one or several components of the module template, and assigning a selectable attribute to the identified one or several components to indicate that the identified components may be selected or omitted when generating a module instance based on the module template. In some embodiments, the user interface allows a user to select a group of components and assign a common selectable attribute to the selected group. The user interface may also support a block type selection feature to allow associating a component such as a function block with a list of several specified types, so that the same user or another operator at a later time could select the desired type from the list and associate the component with the selected type in a particular instance. In some embodiments, the user interface allows a user to select one or a group of components in a module template and assign a shortcut name to the selected component or the group of components. It is contemplated that the user will choose a name descriptive of the function the one or several selected components will perform in an instance based on the module template. Once a shortcut name is assigned, the user interface in some embodiments displays the shortcut name next to or over the one or several components to which the shortcut name has been assigned. When a user assigns a shortcut name to a group of components, the user interface may additionally display a box enclosing the group, a lasso, or another visual indicator to indicate that the shortcut name corresponds to a group of components.

The software environment may save the module template in a template library such as a database and provide the one or more saved module templates to a user during process control design or configuration, via the same or another user interface. In some embodiments, the user interface provides an identifier for each optional component, i.e., a component that may be selected or unselected. Upon choosing a module template suitable for a particular application, the user may select the desired options and activate a control on the user interface to generate an instance of a module consistent with the selected module template and the selected options. A user may generate multiple instances using the same module template, with some of the instances having different selected options.

In some embodiments, the software environment for configuring a process control system protects a module instance linked to a parent module template from erroneous editing by allowing users to modify only those components in the instance that were selected in the parent module template at instance creation. If desired, user interface of the software environment may allow the user to override the protection, sever the link to the parent module template, and modify the instance as desired. Additionally or alternatively, the user interface may protect instances linked to module templates having selectable options by allowing the user to modify only parameter values and not the structure of the instance, at least until overridden by an explicit user command.

In some embodiments, a system development interface of the software environment for configuring a process control system provides an interface function for selecting a module template and requesting that all module instances created using the module template be identified in a selected process area. Optionally, the system development interface may display both the identified module instances and the configuration options associated with these instances. The system development interface may provide another function for efficiently editing the identified instances together (e.g., selecting or unselecting an option of the parent module template, editing a common parameter specified by the parent module template, etc.).

DETAILED DESCRIPTION OF THE DRAWINGS

Figure 3:
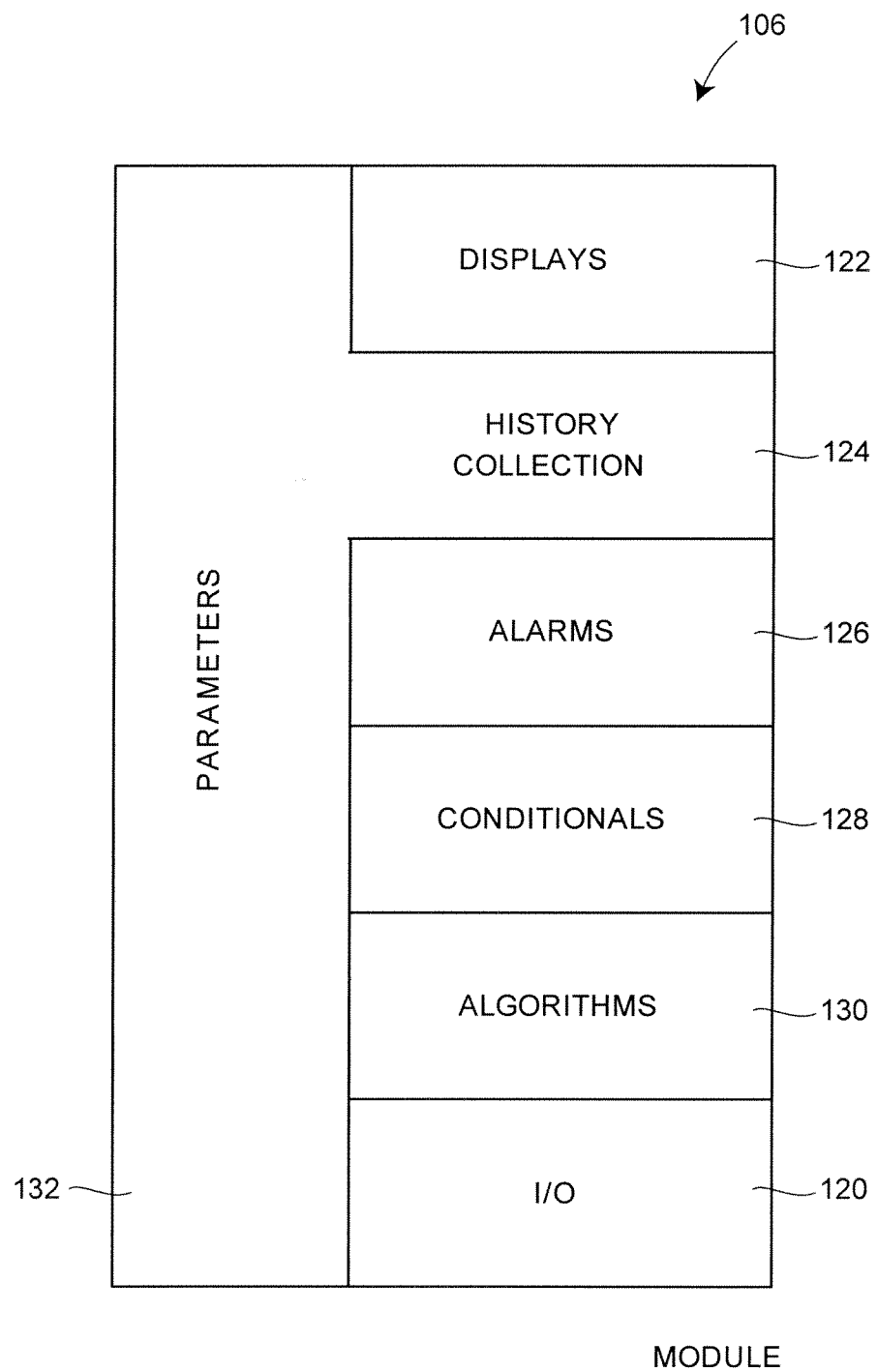

FIG. 3 schematically illustrates components of a known module used to create and maintain a control scheme of a process plant.

Figure 4:
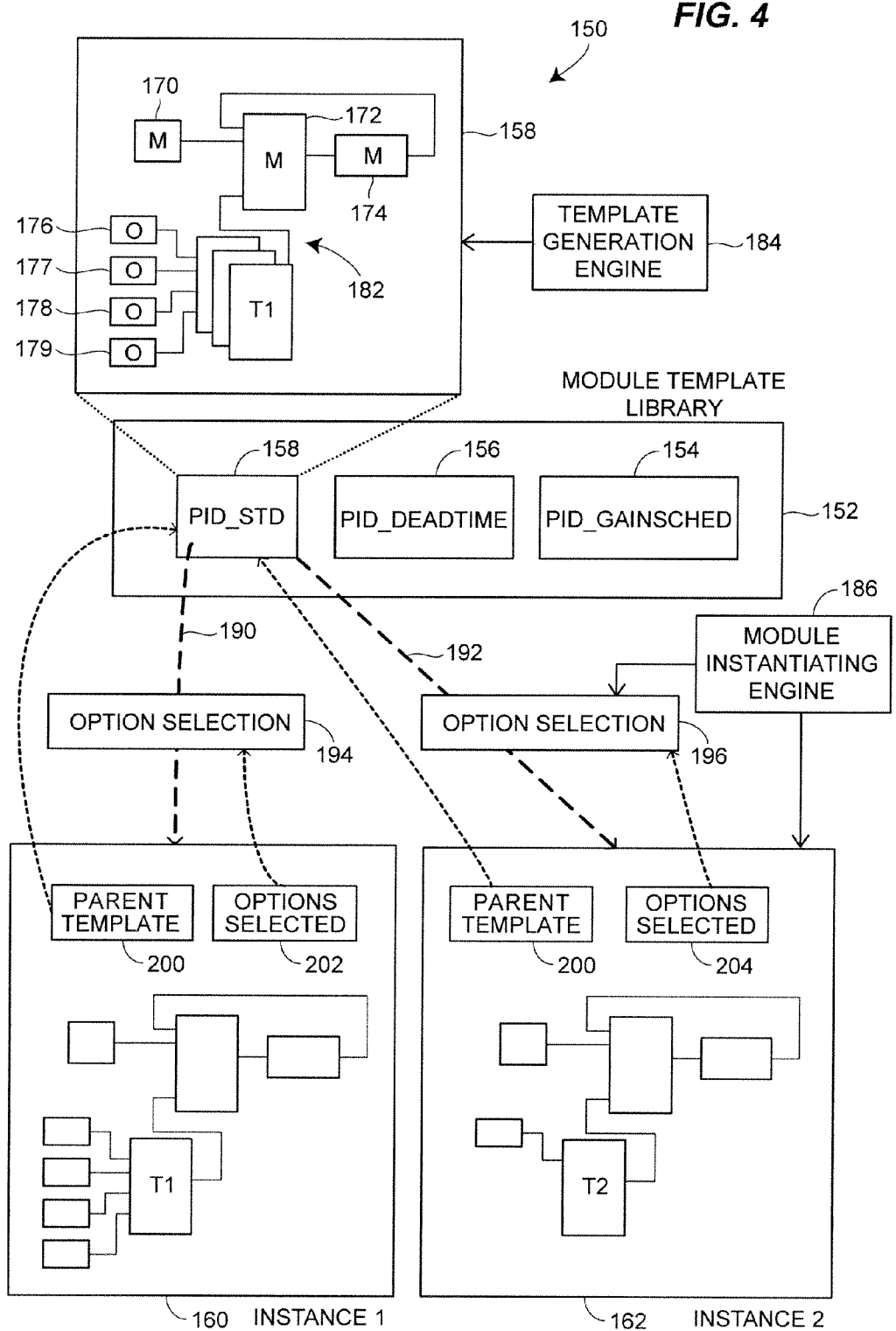

FIG. 4 is a block diagram that illustrates the process of generating several module instances based on a module template with one or more optional components.

Figure 5:
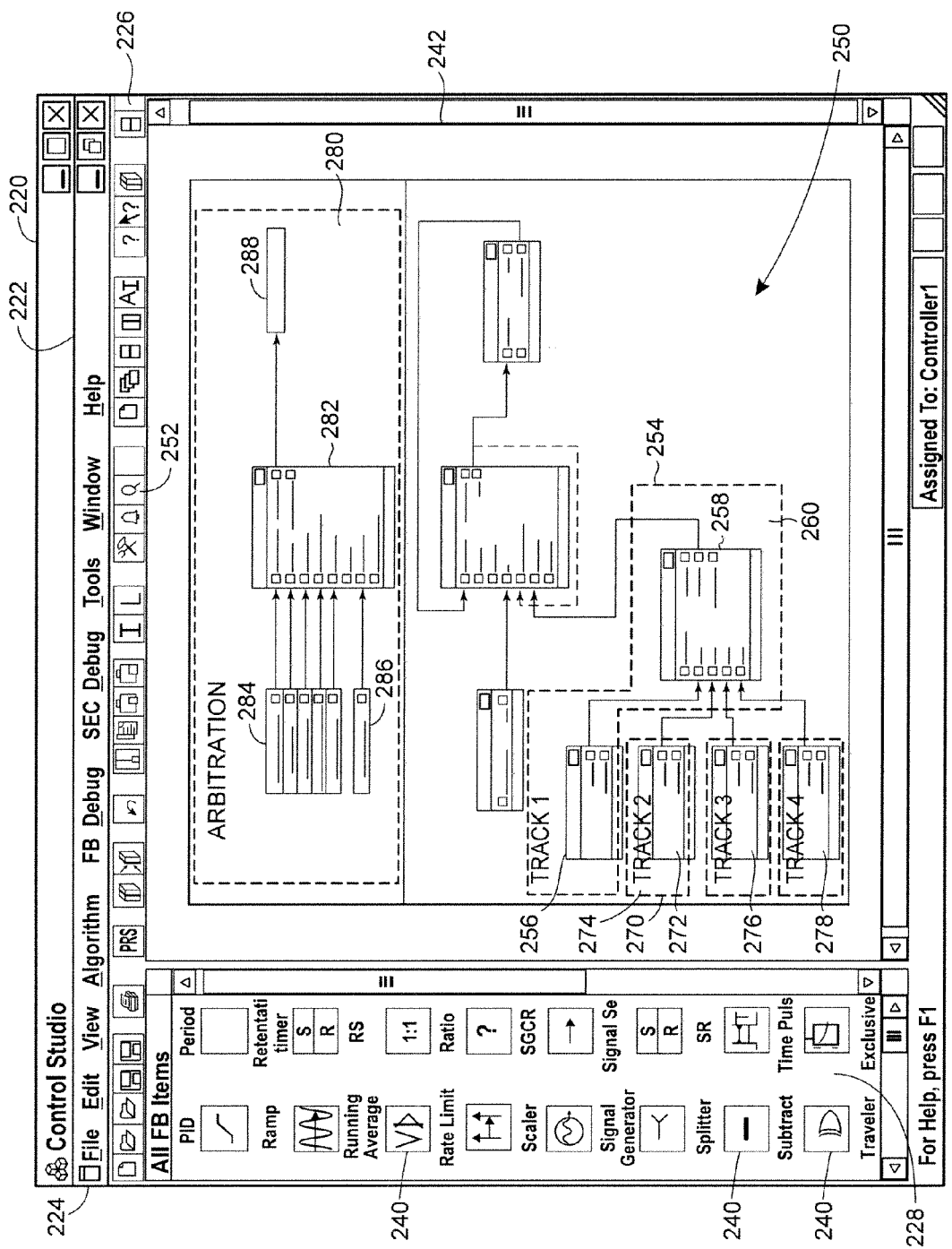

FIG. 5 is an example user interface screen that displays module template having optional components.

Figure 6A:
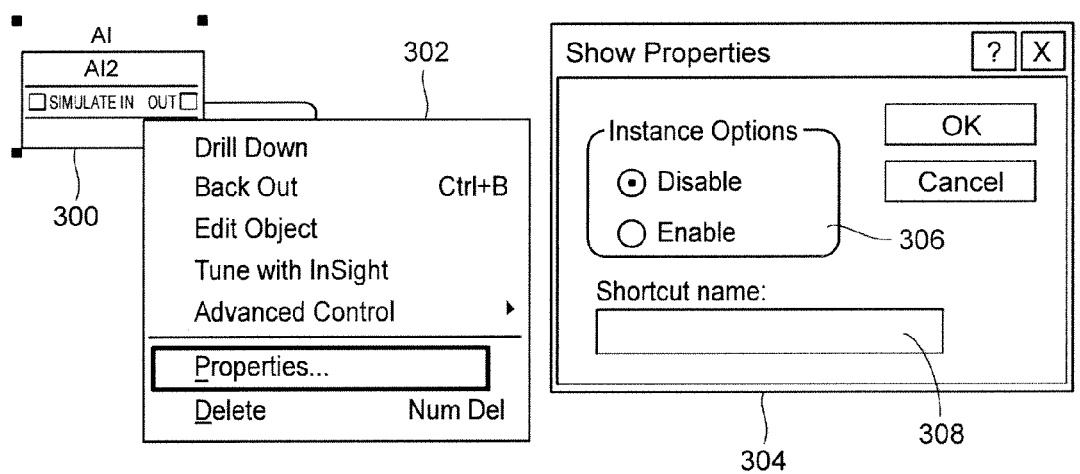
Figure 6B:
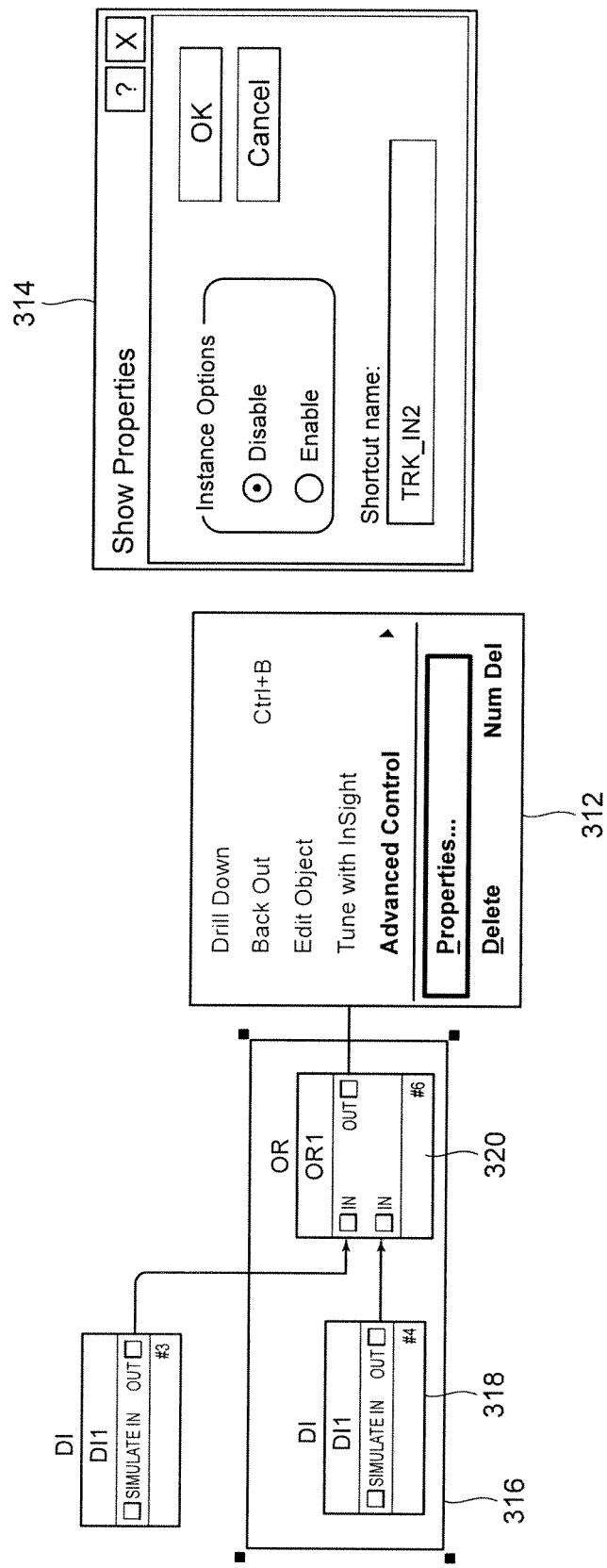

FIGS. 6A and 6B illustrate example dialogue screens for configuring properties of components of a module.

Figure 7:
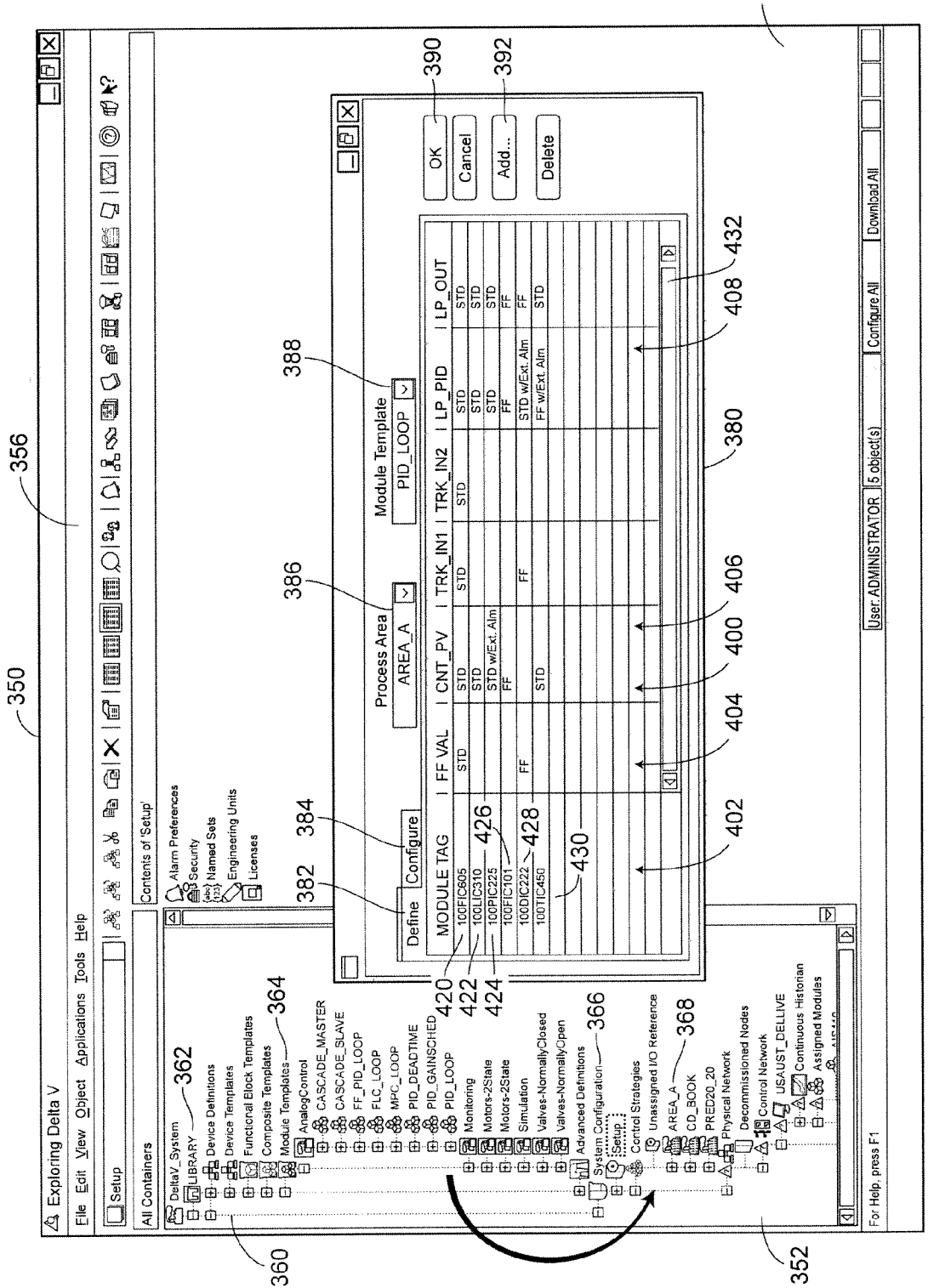

FIG. 7 illustrates an example user interface for selecting a module template having optional components and generating an instance of a module using the module template.

Figure 8:
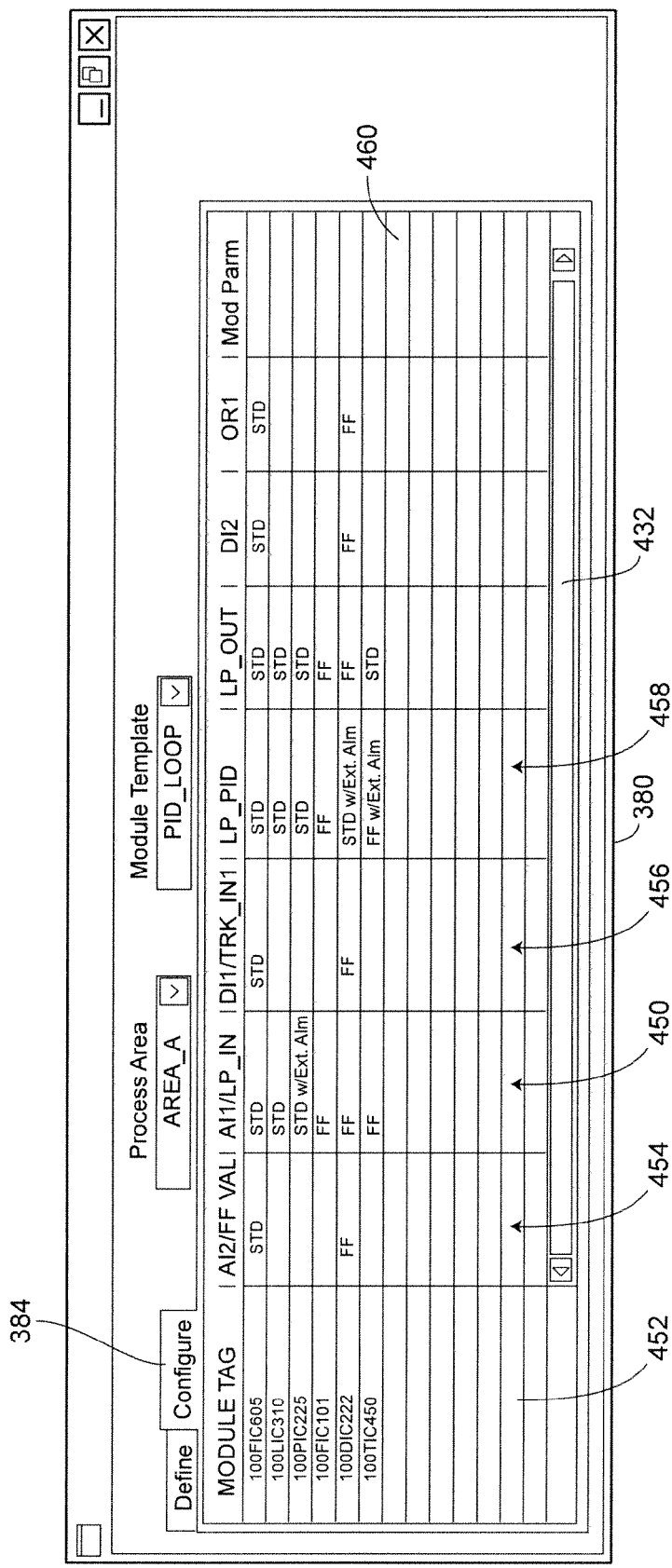

FIG. 8 is an example spreadsheet-style interface screen for viewing and selecting components of one or several modules generated using a specified module template.

Figure 9:
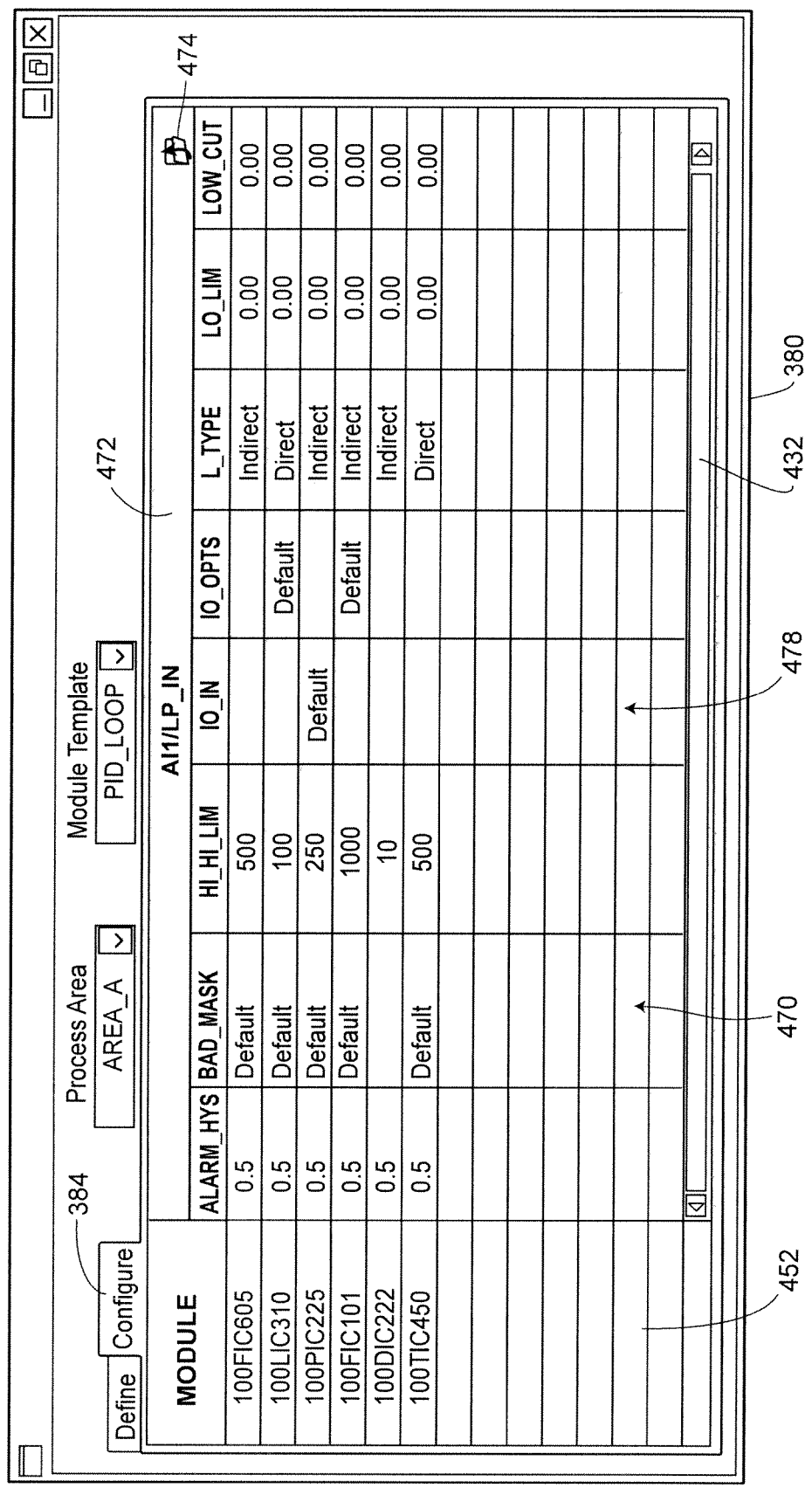

FIG. 9 is an example spreadsheet-style interface screen for viewing and editing parameters of one or several modules generated using a specified module template.

Figure 10:
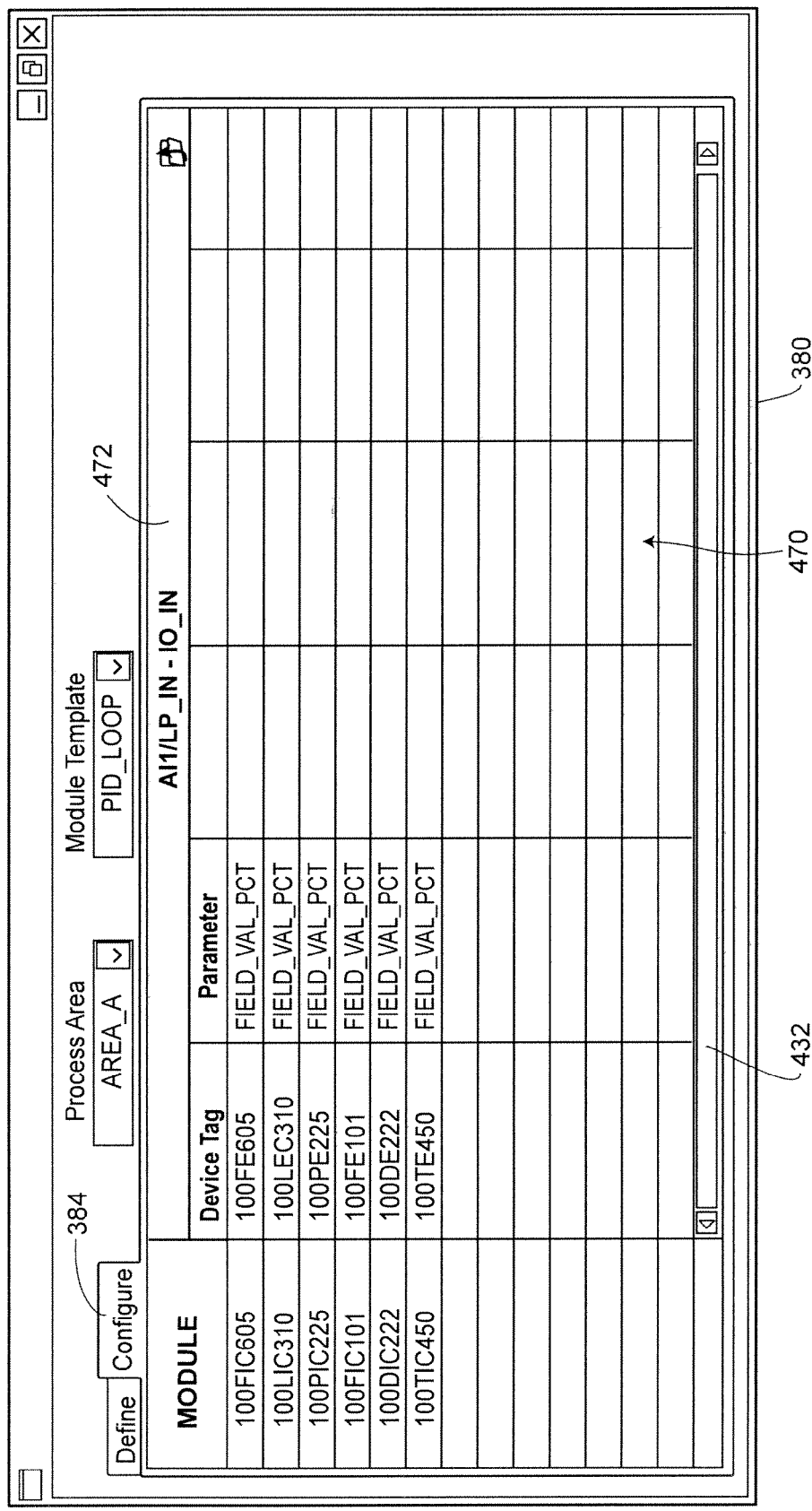

FIG. 10 is an example spreadsheet-style interface screen for editing bitmask or structure-based parameters of one or several modules generated using a specified module template.

Figure 11:
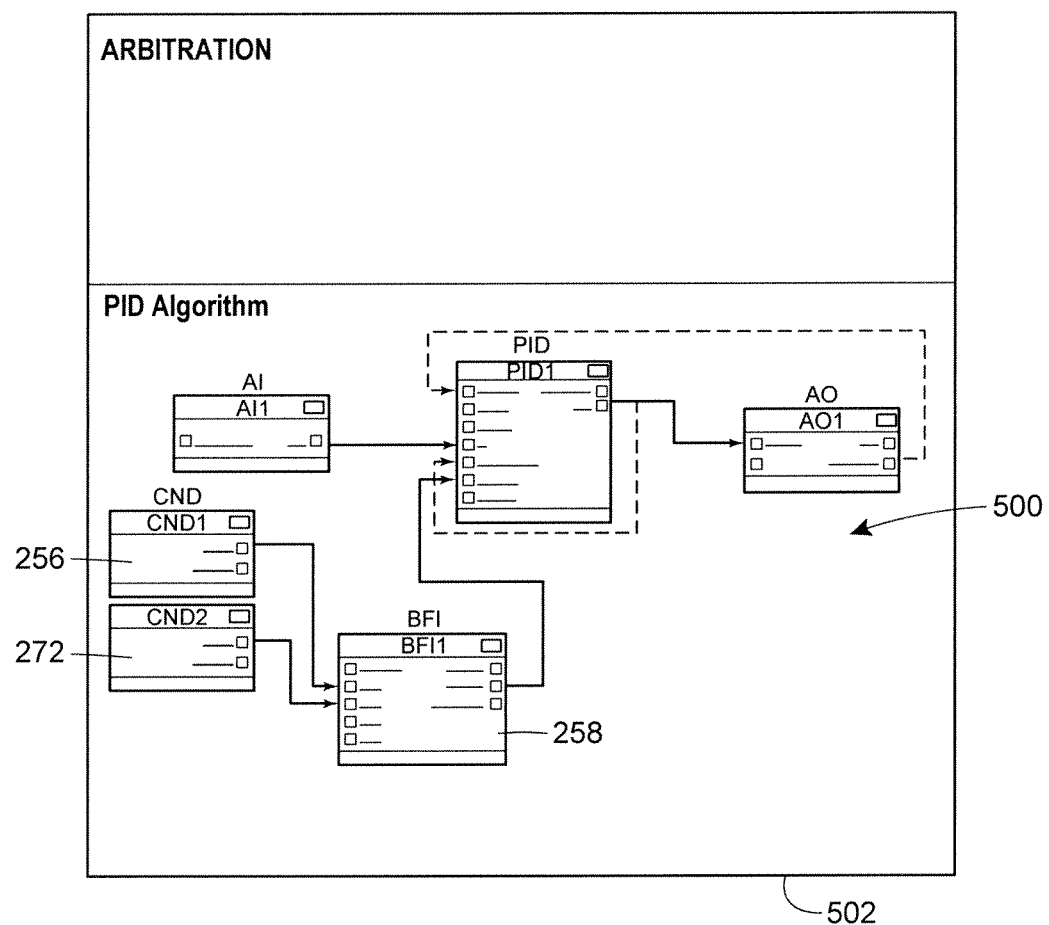
Figure 12:
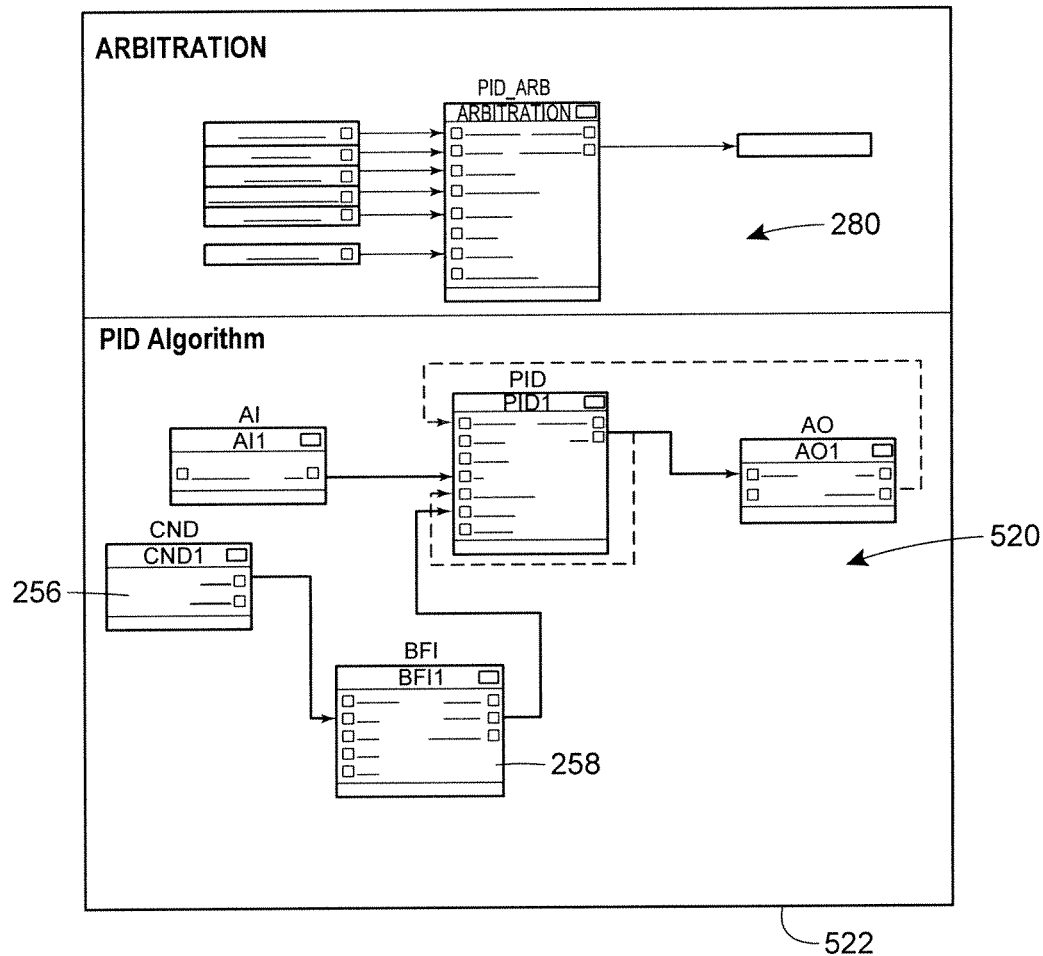

FIGS. 11 and 12 are example user interface screens that display module instances generated using the module template of FIG. 5.

Figure 13:
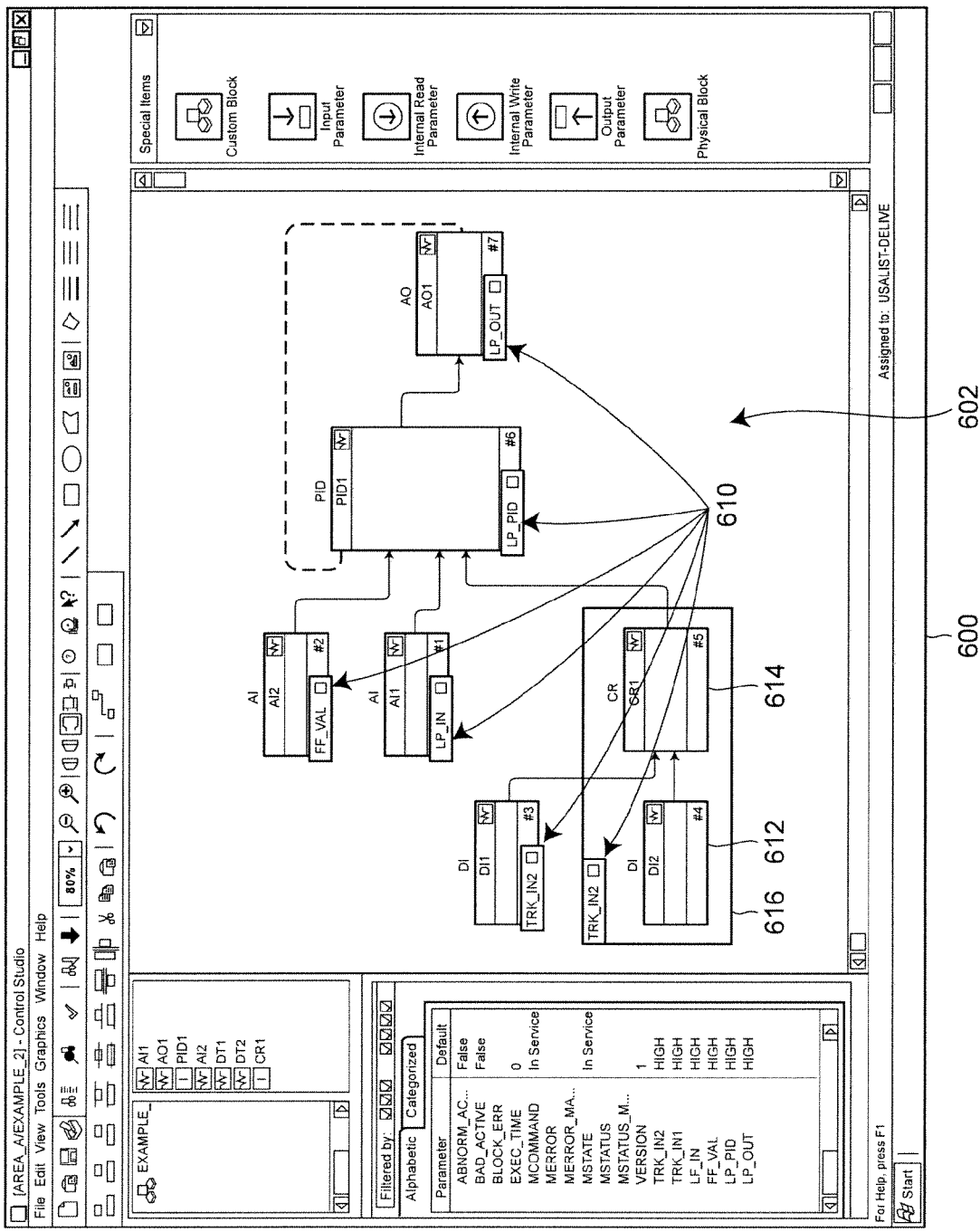

FIG. 13 illustrates a user interface screen that displays several components of a module along with shortcuts names of components and groups of components.

DETAILED DESCRIPTION

Figure 1:
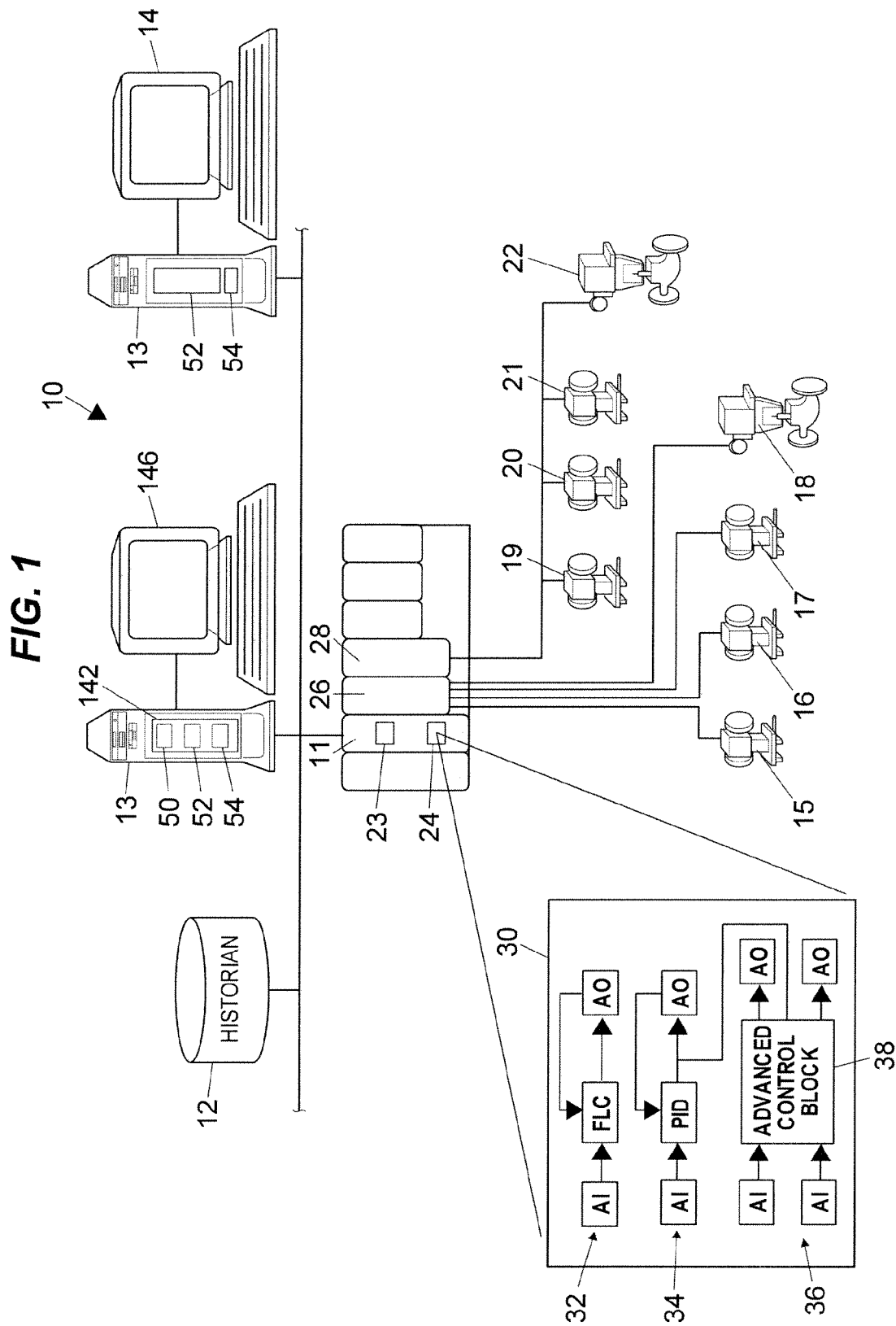
FIG. 1 is a schematic representation of a process control system including a controller, several field devices, and a workstation that may be used to configure the controller and the field devices using module template that have optional components.

FIG. 1 illustrates an example process control system 10 to which the techniques of defining, editing, and using module templates with optional components may apply. The control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV controller sold by Fisher-Rosemount Systems, Inc., is communicatively connected to the host computers 13 and to the data historian 12 via, for example, an ethernet connection or any other desired communication network. The controller 11 is also communicatively connected to the field devices 15-22 using any desired hardware and software associated with, for example, standard 4-20 ma devices and/or any smart communication protocol such as the FOUNDATION Fieldbus protocol, the HART protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 mA devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired wired or wireless standard(s) or protocols, including any standards or protocols developed in the future.

The controller 11 includes a processor 23 that implements or oversees one or more process control routines which may include control loops and communicates with the devices 15-22, the host computers 13 and the data historian 12 to control a process in any desired manner. The control routines may be stored in a controller memory 24 or otherwise associated with the controller 11 (e.g., distributed among smart field devices 19-22). It should be noted that in general, any control routines or modules described herein may include portions that are implemented or executed by different controllers or other devices if so desired. Further, the control routines or modules described herein to be implemented within the process control system 10 may take any form, including software, firmware, hardware, etc. For the purpose of this disclosure, a process control module may be any part or portion of a process control system including, for example, a routine, a block or any element thereof, stored on any computer readable medium. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using function blocks, although the techniques for defining, editing, and using module templates with optional parameters may generally apply to other control methodologies or conventions (e.g., ladder logic, sequential function charts, etc.). In the process control system 10, a function block may be consistent with any scheme in which one or more of control logic, resource logic, communication logic, transducer logic, etc. is encapsulated in a logic block. For ease of explanation, the terms "logic block" and "function block" are used herein interchangeably. Each function block is an object or other part (e.g., a subroutine) of the overall control strategy and operates in conjunction with other function blocks via communications links to implement one or more process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks may also exist. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module or simply module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may be any type of model predictive control (MPC) block, neural network modeling or control block, a multi-variable fuzzy logic control block, a real-time-optimizer block, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

To quickly and efficiently define the control strategy of the process control system 10 without excessive spending of memory and processing resources, an authorized user (e.g., a configuration engineer, an operator, etc.) may define and use module templates with one or multiple optional components and zero or more mandatory components. In particular, the user may develop a module template by selecting or defining function blocks, interconnecting the selected function blocks to define a control routine of a module, defining process parameters of the module, assigning default values to the parameters, etc. As discussed in detail below with reference to FIGS. 4-11C, the user may assign a selectable attribute to some or all of the components to indicate that these components are optional in any particular module instance (or just "instance") based on the module template. The user may similarly identify optional parameters or other module attributes, if desired, and save the module template in a repository such as a database, for example, for use in configuring the process control system 10. The examples below further illustrate the subsequent use of module templates with optional components, including selectively activating components available in the module template via selectable attributes when generating an instance for a particular application, downloading a instance having only the mandatory and selected components into a controller and/or smart field devices, editing the instance in accordance with the module template and the selected optional components, editing multiple instances derived from a common module template, etc. It will be noted that although the techniques related to manipulating optional components are discussed primarily in reference to module templates, similar techniques may also apply to module classes. In the discussion below, the terms "module template" and "module class" are therefore used interchangeably.

In the example illustrated in FIG. 1, the workstations 13 include (either individually, in a distributed manner, or any other fashion) a suite of operator interface applications 50 that support operations related to module templates having optional parameters. An authorized user may also use the suite of operator interface applications 50 to access to view, edit, and supervise various functions of devices, units, and other elements connected within the process control system 10. The suite of operator interface applications 50 may reside in a memory 52 of the workstation 13, and each of the applications or entities within the suite of applications 50 may be adapted to be executed on respective processors 54 associated with each workstation 13. While the entire suite of applications 50 is illustrated as being stored in the workstation 13, some of these applications or other entities may be stored and executed in other workstations or computer devices within or associated or in communication with the system 10. Further, the suite of applications 50 may provide display outputs to the display screen 14 associated with the workstation 13 or any other desired display screen or display device, including hand-held devices, laptops, other workstations, printers, etc. Likewise, the applications within the suite of applications 50 may be broken up and executed on two or more computers or machines and may be configured to operate in conjunction with one another.

To support the techniques discussed herein, the suite of applications 50 may include a template development application or interface for creating and modifying module templates with optional components and a system configuration application or interface for applying (i.e., instantiating) module templates to a particular process area. If desired, a single application or application framework may support both module template development and module template application. As one example, the suite of applications 50 may be consistent with PlantWeb® digital architecture developed by Emerson Process Management and, more specifically, may include one or several DeltaV applications (e.g., Control Studio, Plant Explorer, Operate, etc.). The support for developing and applying module templates with optional components may then be added to the Control Studio application, while module templates with optional parameters may be stored in the DeltaV library along with the more conventional templates and functions. To continue with this example, Plant Explorer may provide further support for operations related to module templates by enabling users to browse the module template library and select the desired module templates, view module instances generated using module templates, determine which of the included components are optional, and perform other operations on the instance. In general, it will be appreciated that functionality related to module templates may be allocated to one or multiple software applications in any desired manner.

Figure 2:
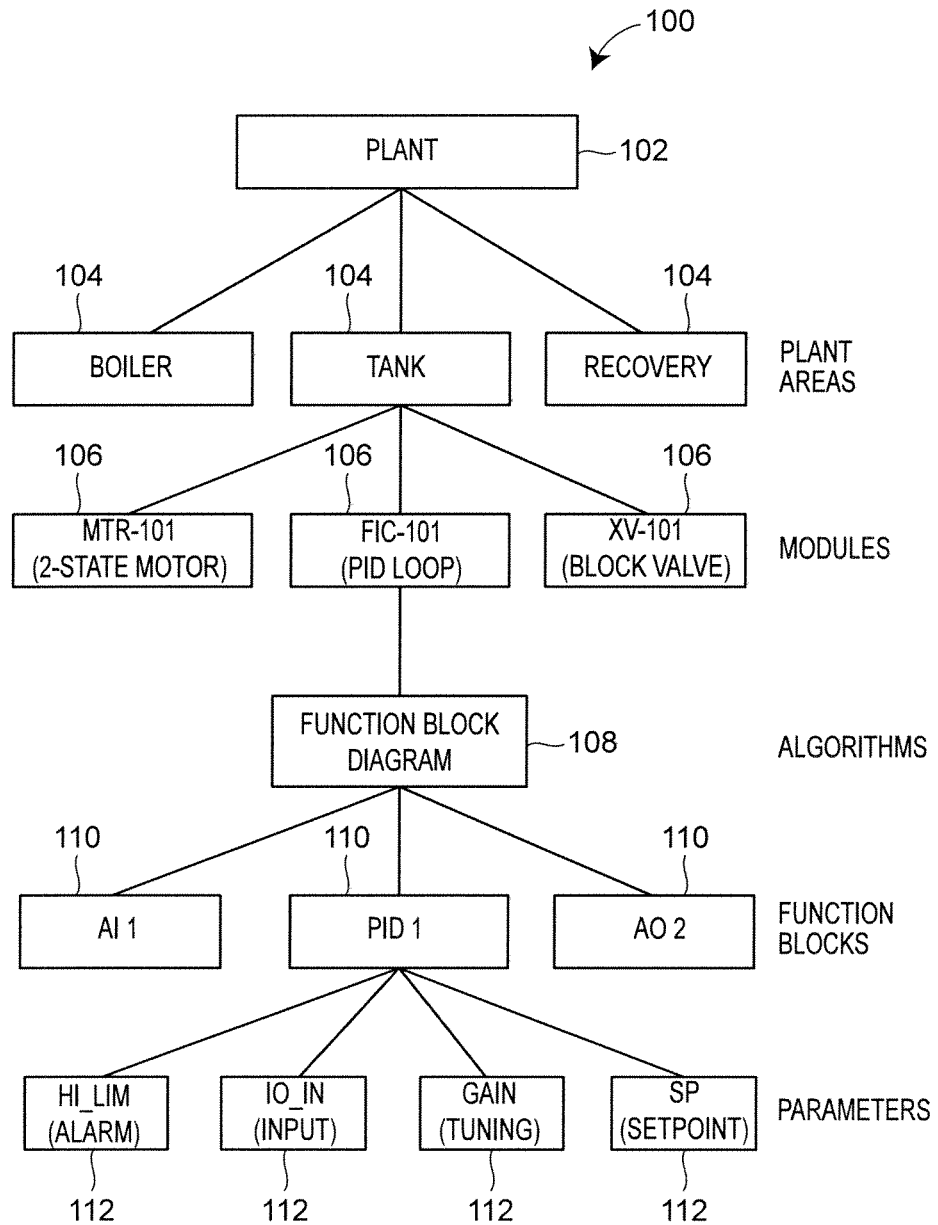
FIG. 2 is a block diagram that illustrates one example of a known hierarchical structure of control elements used in configuring process control systems such as the one illustrated in FIG. 1.

To better illustrate the structure and operation of module templates in a process control environment, FIG. 2 illustrates one generally accepted hierarchical structure of control elements which may be used in configuring the process control system 10, including a module level. FIG. 3 then schematically illustrates commonly used components of a module generally associated with the module level of the hierarchical structure illustrated in FIG. 2. Next, FIGS. 4-10C illustrate the techniques of developing and applying module templates with optional components with reference to various examples of user interfaces of the suite of operator interface applications 50. More specifically, FIG. 4 generally illustrates the technique of generating an instance of a module based on a module template with optional components; FIGS. 5-6B illustrate an example interface screen for developing a module template with optional components; and FIGS. 7A-10C illustrate several examples of instances generated using this module template as presented at a corresponding user interface.

Referring to FIG. 2, a hierarchical model 100 represents a top-down engineering approach to developing a process control strategy. Starting with a plant 102 at the highest level of a tree-like structure, the model 100 includes multiple levels at which a user may view or configure control elements. The plant 102 may be, for example, a chemical plant, an oil refinery, an automated factory, or any other environment with a controlled and (at least partially) automated process. As illustrated in FIG. 2, the plant 102 may include one or several plant areas 104 which, in turn, may include modules 106 to perform a certain basic or advanced control task, as discussed in more detail with reference to FIG. 2. A function block diagram 108 may define the control logic of the corresponding module 106 as one (in a trivial case) or several (in a non-trivial case) interconnected function blocks 110. In this sense, the function block diagram 108 defines the structure of the module 106. The function blocks 110 in turn correspond to parameters 112. In this example, a proportional-integral-derivative (PID) function block is responsible for a control function that depends on tuning parameters such as gain, a certain setpoint (e.g., target pressure), an input signal, etc. In the suite of applications 50, each of the elements 102-112 may be represented by a data structure, a software object, or any other aggregation of data. At least some of the elements also correspond to physical elements in the process control system 100, to parts of physical elements or, conversely, to groupings of physical elements. For example, a PID loop module 106 may correspond to a valve, a positioner, and a sensor, while the gain tuning parameter 112 may correspond to a value stored in a controller memory, a signal propagated via an analog signaling line, etc.

Next, FIG. 3 illustrates the components of the module 106 described with reference to FIG. 3. To interact with physical entities using wired or wireless signaling, the module 106 includes I/O components 120. From the perspective of the suite of applications 50, the I/O components 120 may be protocol-specific drivers associated with a particular software object. On the other hand, the module 106 presents graphical information to users via displays 122 which may include, for example, a graphic icon, a dynamo with animation capabilities, etc. The module 106 may also include a history collection component 124 to collect and manage event data, an alarm component 126, a conditionals component 128, and an algorithms component 130 to manage the operation of the components of the module 106 as, for example, a function block diagram 108 (see FIG. 2). As illustrated in FIG. 3, parameters 132 may be associated with various components 120-130.

Referring to FIG. 4, a configuration environment or system 150 supported by, for example, the suite of applications 50 (see FIG. 1), may utilize at least some of the general methodology discussed with reference to FIGS. 2 and 3. In particular, a module template library 152 may include a number of module templates for use in various applications and scenarios including, for example, a module template 154 for a PID with gain scheduling control, a module template 156 for PID with deadtime compensation control loop, and a module template 158 for a standard PID control loop, also illustrated in an exploded view. In general, each of the module templates 154, 156, and 158 addresses a broad range of functional requirements. Users who contribute to the module template library 152 may be configuration engineers who analyze data related to numerous projects, for example, and may attempt to encompass every potential scenario within a single module template. Other contributors may be users who develop templates in preparation to frequent subsequent duplication of certain identical or similar functionality in a particular project, and may be the same users who later create instances using these module templates. In either case, the module templates 154, 156, and 158 will typically include at least some components (e.g., function blocks, groups of function blocks, parameters, etc.) which a user will find superfluous in the context of a specific application.

To address these and other considerations (e.g., saving controller memory, preserving processing power, reducing the complexity of presentation of a module to a user, etc.), the configuration environment 150 allows users to derive instances having different function blocks from the same module template 158, for example. As a result, although the instances 160 and 162 are based on the module template 158, the instance 160 is structurally distinct from the instance 162. Of course, the instances 160 and 162 may also include different parameters.

When designing or editing the module template 158, a user such as configuration engineer may assign a mandatory attribute to function blocks 170, 172, and 174 to indicate that at least the function blocks 170, 172, and 174 must be present in each instance based on the module template 158. Alternatively, the configuration environment 150 may associate the mandatory attribute with each function block in a module template by default, and the user may override the default attribute if desired and when applicable. Further, the engineer may assign an optional attribute to function blocks 176-179 to indicate that a user can later choose whether to include these function blocks in a particular instance. If desired, the engineer may group the function blocks 178 and 179 together and assign a common optional attribute to the function blocks 178 and 179. Still further, the engineer may assign a substitutable attribute to a function block 182 to allow substitution of various blocks for the function block 182. In at least some cases, the engineer will specify an allowable group of function blocks from which the function block 182 can be selected. In the example illustrated in FIG. 4, the module template 158 specifies three function blocks that could be used as the function block 182. Upon completing the design of the module template 158, the engineer may save the module template 158 in the library 152 which may reside in the memory of the workstation 13 (see FIG. 1), in a separate database, in an online repository, etc.

A template generation engine 184 operating in the configuration environment 150 may support definition of a new module template, modifications to an existing module template, and other functions related to template configuration and management. The template generation engine 184 may cooperate with a user interface that allows users to select of one or multiple components (e.g., function blocks 176-179), assign mandatory or optional attributes to individual components or groups of components, and perform other functions discussed in more detail below. Further, a module instantiating engine 186 may generate module instances 160 and 162 in response to user commands. In particular, the module instantiating engine 186 may allocate memory for the mandatory component and the selected optional components, generate instructions executable on a controller and/or a field device, etc. Additionally, the module instantiating engine 186 may enable collection of historical data (e.g., event data) for the selected optional components in the generated module instances 160 and 162.

Prior to, or at the time of generating the instances 160 and 162 (the instantiation process being represented by arrows 190 and 192), the configuration environment may indicate to the user that the "parent" module template 158 includes optional components during respective option selection stages 194 and 196. The configuration environment 150 may display a graphical dialogue screen, a text-based dialogue screen, a spreadsheet, or any other form of user interface to request that the user specify which of the optional components 176-179 should be included in the instance 160 or 162, and which of the three possible function blocks should be associated with the function block 182. Optionally, the configuration environment 150 may also indicate that the function blocks 170, 172, and 174 are mandatory. In this example, the user selects all function blocks available in the module template 158 when creating the instance 160, and chooses to omit the function blocks 177, 178, and 179 from the instance 162. Further, the user specifies that the function block 182 is of type 1 in the instance 160 and of type 2 in the instance 162. The user thus generates two structurally distinct instances 160 and 162 based on the shared module template 158.

In graphical representations of the instances 160 and 162, the configuration environment 150 may preserve the original structural layout of the parent module template 158 and display blank spaces where the unselected optional components are disposed in the module template 158. In this manner, the configuration environment 150 provides a certain level of comfort to the user because the instances 160 and 162 can be easily identified as derivatives of the module template 158. Moreover, should the user decide at a later time to re-activate some of the originally rejected optional components, the configuration environment 150 will display these reactivated components in the pre-allocated positions. To take one specific example, the user may decide to edit the instance 162 and select the optional function block 177 at a later time. The configuration environment 150 will display the function block 177 in the position specified by the module template 158.

With continued reference to FIG. 4, each of the instances 160 and 162 may include a parent template identifier 200 logically linking these instances to the module template 158. As discussed in greater detail below, the parent template identifier 200 may be used for various purposes including identifying all instances based on the module template 158 within a specified process area, simultaneously editing the instances 160 and 162 using a common dialogue, etc. Further, each of the instances 160 and 162 may also include a respective options selected field 202 or 204 to indicate which of the options available in the module template 158 have been activated in the particular instance. In some embodiments, the options selected field 202 may be a bit mask in which each bit corresponds to an optional component, and a value stored in the bit indicates presence or absence of the component in the instance. Each of the parent template identifier 200 and the options selected field 202 or 204 may be saved as a part of object data of the instances 160 or 162, or saved separately and logically linked to the instances 160 and 162.

In some embodiments, the configuration environment 150 may use the parent template identifier 200 as a form of protection to restrict users to editing only those components and parameters that are specified by the module template. When necessary, the user may override the protection using a pre-defined command or procedure. The configuration environment 150 may also allow users to sever links between instances and module templates. For example, the user may wish to make structural changes to the instance 162 outside the scope prescribed by the parent module template 158. The configuration environment 150 may automatically generate a dialogue to inform the user that by making these changes, the connection to the parent template will be lost. Upon receiving a confirmation from the user, the configuration environment 150 may delete or modify the fields 200 and 204 to disassociate the instance 162 from the module template 158. In subsequent operations, the configuration environment 150 will treat the instance 162 as built "from scratch," i.e., from basic function blocks available in a conventional library.

Now referring to FIG. 5, the configuration environment 150, supported by some or all of the suite of applications 50 (see FIG. 1), may include an example interface screen or window 220 for configuring module templates such as the templates 154, 156, and 158 discussed above. The interface screen 220 may include a toolbar 222 with textual pull-down menus 224 and a pictographic menu 226, a stencil window 228 displaying stencil items 240, and a diagram window 242. If desired, the toolbar 222 may be a ribbon-style interface similar to the one developed by Microsoft Corporation, for example. The stencil window 228 may include any number of pre-defined control elements or blocks such as function blocks or resource blocks. In some embodiments, the stencil window 228 may also provide topical arrangement of blocks (e.g., all blocks related to feedback control) or other forms of grouping. Further, each stencil item may include an icon (e.g., a commonly used engineering symbol, a descriptive drawing, etc.) for quick visual identification of the related function. When designing a module template using the interface screen 220, a user may select a stencil item from the stencil window 228, drag the selected stencil item to a desired location within the diagram window 242, and drop the selected stencil item in the desired location. The suite of applications 50 may thus provide an intuitive configuration environment in which users may use a simple drag-and-drop interface to quickly build module templates. However, it will be noted that the configuration environment 150 may also interact with users via a different type of user interface such as text commands, to take one example.

Generally with respect to the user interface, the configuration environment 150 may include some or all of a main/edit pane for textual or graphical configuration of modules, control routines, and other parts of the control strategy of the process control system 10; an explorer pane for browsing various libraries control elements, and process areas; a palette pane to present icons for efficient selection and placement in the main pane via a drag-and-drop operation, with optional division into functional groups, for example; an alarm pane to display identifiers, priority, and description of various alarms; a parameter pane to list names, default values, current values, etc. of various operational parameters; a reference pane to list addresses of physical modules; a slide bar to allow users to easily select the desired size of graphics presented in the main pane; a watch pane; a formula pane; a status bar to indicate the current status of the configuration environment 150 (e.g., "edit"), etc. In short, information related to the process control system 10 in general, and to modules and module templates in particular, may be presented in any desired manner.

In the diagram window 242, FIG. 5 illustrates one particular example of module class or template developed using the techniques outlined above. In particular, the module class PID_STD supports a standard PID algorithm to control a process variable based on a setpoint and an error signal. A configuration engineer may design the control module template PID_STD to include most or, if possible, all the capability required for the most complex contemplated PID control. In this respect, the module template PID_STD is similar to the template PID_LT available in PBL. However, it will be noted that FIG. 5 does not illustrate certain blocks and parameters of a PID_LT template for the purposes of clarity and conciseness.

A diagram 250 illustrates one possible layout of the components of the module template PID_STD. When designing this and other module templates, the user may point and click on an icon 252 in the pictographic menu 226 to activate an area selector tool, draw a box (or other shape) 254 around an interlock condition function block 256 and a Boolean fan input (BFI) function block 258 to define an area 260, right-click to activate a properties menu, and assign the optional attribute to the interlock condition function blocks 256 and 258. If desired, the optional attribute may apply to the interlock condition function blocks 256 and 258 in aggregate. Alternatively, the interface window 220 may include an icon in the pictographic menu 226 for activating a function that would combine the steps of selecting one or several function blocks and assigning the optional attribute to the selection. Of course, the interface window 220, or another interface element of the configuration environment 150, may include any desired type of selection and property assignment tools such as highlighter tools, text-based command dialogues, programming script support, etc.

With continued reference to FIG. 5, the user may similarly draw a box 270 around an interlock condition function block 272 to define an area 274. In some embodiments, the configuration environment 150 may allows a user to associate the optional attribute directly with a selected function block if, for example, the user does not wish to operate with aggregates of function blocks. Accordingly, the user could click on the interlock condition function block 272, activate an option selection menu, and assign the optional attribute thereto. As further illustrated in FIG. 5, the user may also draw separate boxes around interlock condition function blocks 276 and 278, as well as around several function blocks and parameters in an area 280 collectively responsible for equipment arbitration logic. It will be noted that in addition to a PID arbitration block 282, the area 280 also includes several parameters such as, for example, ACQUIRE_ID (input parameter 284), OVR_ENAB (input parameter 286), and OWNER_ID (output parameter 288). Thus, the configuration environment 150 supports a selection of function blocks, parameters, or combinations of function blocks and parameters.

In addition to assigning the optional property to function blocks or groups of function blocks, the user may optionally assign a name to each of the areas 260, 274, 280, etc. For example, the user may assign the name TRACK 1 to the area 260, TRACK 2 to the area 274, and ARBITRATION to the area 280. Preferably, each name reflects the aggregate function associated with the selected area in the specific context of the module template. More specifically, the name TRACK 2 indicates to a future user of the PID_STD template that the corresponding interlock condition function block 272 may service a second input, or "track," in a multi-track PID loop.

To continue with the example discussed with reference to FIG. 5, the user may save the module template PID_STD in a template library of the process control system 10 (disposed in the memory 52, for example), in an online repository, or in a separate storage device. If desired, the user may associate the module template PID_STD with a module class. In either case, the module template PID_STD may be stored in a predefined format recognized by the configuration system 150, so that the same or a different user may create module instances based on the module template PID_STD.

FIGS. 6A and 6B illustrate example menus and dialogues which the configuration environment 150 may display to support some of the attribute assignment techniques discussed above. In particular, FIG. 6A illustrates a function block 300 and a pull-down menu 302 that may pop-up in response to a user double-clicking on the function block 300, for example. The pull-down menu 302 many include a properties menu item which, when selected, may trigger a user dialogue 304 for enabling or disabling the optional property and assigning a shortcut name of the function block 300. In this example, the user dialogue 304 includes a radio button 306 with ENABLE and DISABLE options and a text input box 308 which the user may optionally fill in. FIG. 6B illustrates similar pull-down menu 312 and user dialogue 314. However, the configuration environment 150 applies the pull-down menu 312 to an area within a box 316 that encloses function blocks 318 and 320. In other words, the option specified via the dialogue 314 applies to a grouping of several function blocks.

In one example illustrated in FIG. 7, an interface window 350 of the configuration system 150 provides a convenient and efficient drag-and-drop interface for creating and customizing, by selecting the desired options, multiple instances based on a certain class-based module template PID_LOOP. The interface window 350 in this embodiment includes a module explorer pane 352, a detailed view pane 354, and a toolbar 356. The module explorer pane 352 may list various elements of the process control system 10 in form a hierarchical tree 360 that includes a library branch 362 that, in turn, includes a module templates branch 364. In general, the elements in the module explorer pane 352 can be listed and presented in any desired manner. Further regarding the hierarchical tree 360, a system configuration branch 366 may list elements related to a particular control strategy including a group of elements for a certain process area "A" under the branch 368.

To create one or several module instances from a module template PID_LOOP for continuous control, for example, the user may drag the module class PID_LOOP to the desired process area or region such as the area corresponding to the branch 368. The process region may be an area, a unit, a cell, or any other entity for which the configuration environment 150 allows module assignment. The configuration environment 150 at this time may automatically display a module development interface 380 for defining and naming one or more modules that are to be created from the module template PID_LOOP, and for selecting optional components for the one or more modules. Alternatively, the user may launch the module development interface 380 using a dedicated menu item or a certain command. The module development interface 380 may include a definition tab 382, a configuration tab 384, a process area selection menu 386 (e.g., a pull-down list), and a module template selection menu 388. The user may complete the definition and configuration process by clicking on the OK button 390. In some embodiments, an ADD button 392 enables the user to add module instances based on the selected module template, i.e., the template PID_LOOP.

In some embodiments, the configuration environment 150 may display the module development interface 380 only if the corresponding module template includes at least one optional component. In other words, if a certain module template includes only mandatory components, displaying the system development interface when generating an instance is unnecessary.

FIG. 7 illustrates the module development interface 380 with the definition tab 382 activated, and a definition area 400 accordingly in the foreground. In general, the definition area 400 may have any layout and include any desired types of controls, selectors, and/or dialogues. However, the example in FIG. 7 illustrates a particularly convenient tabular or spreadsheet layout of the definition area 400 in which each individual module is identified by a unique tag in a column 402, each optional component of the module template PID_LOOP is identified in a separate column such as columns 404, 406, or 408, and each row 422-430 specifies the options selected for the corresponding module. In other words, each cell in the definition area 400 identifies an option for a certain module/optional component tuple, with a blank space indicating omission of the item. Thus, the row 420 indicates that for a module instance identifiable by the tag 100FIC605, a standard (STD) type or "flavor" of the optional component identified in the column 404 (in this example, a function block associated with the feedforward control input value parameter) has been selected, while the row 422 indicates that a module instance with the tag 100LIC310 does not include this component at all. To consider another example, the information in the definition area 400 indicates that each of the six listed instances includes the optional component LP_PID, but while the instances in the rows 422, 424, and 426 include an LP_PID component of type STD, the instance in the row 426 includes an LP_PID component of type FF, the instance in the row 428 includes an LP_PID component of type STD with extended alarm, and the instance in the row 430 includes an LP_PID component of type FF with extended alarm.

In general, a user may click on any cell in the definition area 400 to select and unselect a certain option, change a value (e.g., component type) in the cell, etc. The user may also operate a slider bar 432 to bring the desired column into focus. In this and similar interface windows of the configuration environment 150, the module tag column 452 may remain in the same position when the slider bar 432 is being operated. In some embodiments, each cell may automatically provide a pull-down list of types available for the particular optional component. As discussed above, certain optional components may be either present or absent in an instance, and the corresponding cells may then display a checkmark or another visual indicator when the user chooses to include the optional component in the instance. If desired, the definition area 400 may also list mandatory components to help users identify all function blocks associated with the selected template. In this case, mandatory components are preferably presented in a grayed-out form or under a separate tab to prevent confusion. It will be also noted that in addition to function blocks, the definition area 400 may list parameters and other components of the module template (see FIG. 3). Further, the definition area 400 may optionally display shortcut names assigned to components or groups of components as discussed above with reference to FIGS. 6A and 6B.

In view of the foregoing, it will be appreciated that the configuration environment 150 may provide a listing (or other form of identification) of optional components using any desired layout such as, a tabular form that includes multiple instances and multiple components, a hierarchical tree with optional components listed under instance-specific branches, a separate tab for each instance, etc. Further, the configuration environment 150 may provide any type of a selector for each optional component to allow the user to specify whether the optional component should be excluded, included in the only variant specified by the module template, or included in one of several types specified by the module template. In some embodiments, the selector may include a multi-stage dialogue for first specifying whether the optional component should be included in the particular instance and, in case the module template specifies multiple possible types of flavors of the optional component, for subsequently specifying which of the possible types of flavors should be used. In other words, the configuration environment 150 may provide a type selector separate or integral with the presence selector for an optional component.

FIG. 8 illustrates another operational state of the module development interface 380. In particular, when user activates the configuration tab 384, the module development interface 380 places the configuration area 450 in the foreground. The layout of the configuration area 450 may be similar to the layout of the definition area 400. In the example of FIG. 8, a column 452 lists tags of individual module instances, and columns 454-458 list optional components of the module template PID_LOOP. The user can click on any desired cell and modify the selection of an optional component. Additionally, the user may click on a column 460 to activate a parameter configuration view of the module development interface 380. It will be appreciated that the configuration area 450 allows users to efficiently configure multiple modules sharing a common source template. In addition to improving the speed and efficiency of configuration, by supporting a common configuration area 450 the module development interface 380 also provides a clear view of functional differences between modules. In particular, by looking at the tabulated listing of optional components as illustrated in FIG. 8, the user can immediately identify functional differences between the instances with tags 100FIC101, 100DIC222, and 100TIC450, without activating a separate interface screen for each module. Further, the module development interface 380 reduces the probability of operator error if, for example, the user wishes to select the same type of optional component in the column 458 in every instance. Still further, the module development interface 380 in some embodiments may provide a function to apply a common selection option (e.g., type FF) to each row of the configuration area 450 for a particular optional component (e.g., AI1/LP_IN).

Referring to FIG. 9, the module development interface 380 may also foreground the parameter configuration area 470, which is generally similar to the parameter configuration area 450. However, the parameter configuration area 470 also displays the name of the corresponding function block on a bar 472 to identify the optional component to which the parameters apply, and includes an up folder icon 474 enable quick return to a previous level of the configuration view. In at least some of the embodiments, the user can directly type numeric or alphanumeric parameters into cells corresponding to various module/parameter tuples. The parameter configuration area 470 may be activated by clicking on the module parameter column 460 (see FIG. 8) as indicated above. Alternatively, the user may click directly on the graphical or textual identifier of the module in, for example, the module explorer pane 352 or the detailed view pane 354 (see FIG. 7).

In some cases, a parameter such the parameter LP_IN in column 478 may be defined as a structure or a bitstring. FIG. 10 illustrates yet another operational state of the module development interface 380 in which a user modifies LP_IN or a similar compound parameter. In this view, the bar 472 displays the name of the parameter, and the configuration area 470 is accordingly updated to display information relevant to the bitmask or structure-based parameter. In this sense, the module development interface 380 provides an efficient approach to "drilling into" components and parameters.

Referring back to FIG. 7, after the user enters the options and module tags, he or she may click on the OK button 390. In response, the configuration environment 150 will generate six module instances, each configured according to the options specified in the respective row 420-430, and place the generated instances in the branch 368, in the location to which the user dragged the module template PID_LOOP. In some embodiments, the module development interface 380 may include an additional parameter for each instance to specify the location of the instance. If desired, the configuration environment 150 may automatically initiate the process of applying the configured instances to the corresponding physical elements such as controllers, or the user may activate a separate control to begin the download process. It is also contemplated that instances based on a module template with optional components need not store certain attributes (e.g., the parent template identifier 200, the options selected field 202-204, etc.) within the object. To preserve controller memory, these attributes may be stored in the memory of the workstation 13, in a local or online database, etc.

Alternatively, the configuration environment 150 may communicate the configuration information related to the six module instances to be instantiated to another component of the suite of applications 50. For example, the suit of applications 50 may include a module instantiating engine that allocates workstation memory for module instances, communicates with a database to update instance references and other information, and downloads module instances to the controller 11 and/or the smart field devices 19-22 (see FIG. 1), directly or via a communication component of the suite of applications 50. It will be noted that in general, functionality related to rendering user interface screens, allocating processing and memory resources, and applying module instances to controllers and field devices may be distributed among the workstations 13 and, in some embodiments, other computing devices in any desired manner.

It will be appreciated that the module development interface 380 may be invoked at a later time, such as when the requirements of the process control system 10 change, to edit a previously instantiated module. Moreover, a user may invoke a certain function to select a module template and automatically identify all module instances instantiated from the specified module template. In this manner, the user may efficiently locate and update multiple module instances even if these module instances are not identical due to an earlier selection of different options in the corresponding parent module template. For example, an operator may choose to replace several 4-20 mA legacy field devices performing a particular function with Fieldbus devices performing the same or similar function in a certain process area. To properly configure these changes in the configuration environment 150, the operator may invoke a function that identifies all modules, in a certain process area, that were derived from a module template developed for the particular function (provided, of course, the instances were originally created using a module template with optional components). Using interface screens similar to those discussed above with reference to FIGS. 7-10, the user may change one or several appropriate optional components in the multiple instances to correspond to the new Fieldbus configuration, e.g., by specifying a new type or flavor of a function block. In this sense, the user can efficiently propagate changes applicable to multiple modules without locating each module individually, invoking an appropriate dialogue, etc. In some embodiments, the configuration system 150 may also provide a user interface other than a spreadsheet for collective editing of instances.

In another scenario, the user can easily add a component available in a module template to an instance based on the module template in which the component was not originally selected. The configuration environment 150 may present interface screens similar to the module development interface 380. Moreover, the user can propagate additions or deletions to multiple instances that share a common parent module template.

In another aspect, module templates may include standard display elements or groups of display elements adapted to reflect selections of optional components. Accordingly, module instances may store or reference only those display elements that have actually been selected in the instance. When the configuration environment 150 generates a graphical representation of a module instance, the graphical representation can reflect the selected options to improve clarity and consistency of presentation. By contrast, at least some of the configuration environments available today sometimes produce cluttered and confusing displays of template-derived modules by depicting components that have been disabled by parameters set to FALSE or zero, and are effectively absent in a physical counterpart of the module.

To better illustrate the advantages of flexible graphics associated with module templates of the configuration environment 150, FIGS. 11 and 12 depict two examples of module instances generated using the template PID_STD discussed above. Simultaneously referring to FIGS. 5 and 11, a module diagram 500 in an interface screen 502 corresponds to an instance based on the module template PID_STD in which the interlock condition function blocks 256, 258, and 272 have been selected while the function blocks 276 and 278, along with function block and parameters in the area 280, have been omitted. On the other hand, a module diagram 520 in an interface screen 522 (FIG. 12) corresponds to another instance based on the module template PID_STD. The instance of FIG. 12 includes the optional interlock condition functional block 256 and the arbitration functionality associated with the area 280. Of course, both instances also include non-optional components. The blocks (and associated wiring) included in the instances of FIGS. 11 are different even though both were instantiated from the PID_STD template. However, the interface screens 502 and 522 places optional blocks 256, 272, etc. in the positions specified in the module template PID_STD. In this manner, a user working with multiple instances based on the template PID_STD can immediately identify functional differences between the instances.

To activate only those display elements that are being used in a particular instance, the configuration environment 150 may use the options selected field 202-204 and the parent template field 200 (see FIG. 4). In particular, the configuration environment 150 may retrieve display elements or reference to display elements by following the link to the parent module template, and determine which display elements should be used in rendering the diagram 500 or 520 using the options selected field 202. Further, in addition to static display elements such as function block icons and standard shapes, the configuration environment 150 may similarly support dynamos, animations, and other graphical elements. For example, the configuration environment may automatically generate (or select from a repository) a dynamo script that corresponds to the selected options and the non-optional components.

Further with respect to graphical depiction of module instances, shortcut names specified as described above with reference to FIGS. 6A and 6B may be displayed in printed documents, in the offline mode, and in other contexts both within and outside the scope of the configuration environment 150. As illustrated in FIG. 13, for example, an interface screen 600 may display a diagram 602 in which function blocks are illustrated with shortcut names 610 assigned to the corresponding optional components. It will be noted that because function blocks 612 and 614 in this example are associated with a single aggregate optional component, enclosed in a box 616, the function blocks 612 and 614 share a single shortcut name displayed in a corner of the box 616.

Generally with respect to FIGS. 3-13, it is also contemplated that a module template may optionally include a software lock to prevent changes to the template after one or more instances have been created using the template.

It will be also noted that although the techniques of developing and applying module templates having optional components are discussed above with primary reference to PID loops, a module template library can cover a wide variety of control routines and may include, for example, module templates for analog control (e.g., PID loops), monitoring (e.g., analog input monitoring), two-state motors (e.g., controls for pumps and agitators), three-state motors (e.g., controls for forward/reversing motors), two-way valve control, simulation, etc.

While the present system and methods have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A process control configuration method in a computer system for developing a process control strategy of a process plant, comprising:
   providing a shared module template from among a plurality of shared module templates, the shared module template having a plurality of at least partially interconnected function blocks that may be executed by a processor to implement the process control strategy by facilitating one or more physical functions within a process control system of the process plant and,
   wherein one or more of the plurality of at least partially interconnected function blocks includes a multiplicity of parameters associated therewith for carrying out a process control operation in the process plant,
   receiving a plurality of attribute selections for one or more of the plurality of at least partially interconnected function blocks via a user interface to define (i) a mandatory set of function blocks having a mandatory attribute, and (ii) an optional set of function blocks having an optional attribute;
   receiving a plurality of selections indicating which of the optional set of function blocks are to be instantiated in a plurality of respective module instances;
   generating the plurality of module instances based on the shared module template by instantiating the mandatory set of function blocks and the optional set of function blocks as designated by the plurality of selections received for each respective module instance; and
   associating each of the plurality of generated module instances with respective process control strategies by generating a set of instructions executable on a processor for use in a physical device operating in the process plant in accordance with the plurality of generated module instances,
   wherein the plurality of generated module instances are structurally distinct from one another based upon differences between their respective optional sets of function blocks,
   wherein the plurality of at least partially interconnected function blocks belong to a hierarchical control element structure lower than (i) a module instance, and (ii) the physical device within the process control system for which the plurality of at least partially interconnected function blocks facilitate control.

2. The method of claim 1, further comprising:
   displaying, on the user interface, a graphical representation of one of the generated module instances by displaying display elements that correspond to the (i) mandatory set of function blocks and only (ii) the optional set of function blocks as designated by the selection received for displayed one of the generated module instances.

3. The method of claim 1, wherein
   generating the plurality of module instances further includes:
   unconditionally including each of the mandatory set of function blocks in the plurality of generated module instance for each of the plurality of generated module instances based on the shared module template.

4. The method of claim 1, further comprising:
   providing a template library having a plurality of shared module templates,
   wherein providing the shared module template includes:
   providing the shared module template in response to a selection of one of the plurality of shared module templates from the template library.

5. The method of claim 1, wherein providing the shared module template includes:
   displaying a dialogue screen listing the plurality of at least partially interconnected function blocks and having a respective selection control for each of the plurality of at least partially interconnected function blocks.

6. The method of claim 5, wherein the dialogue screen includes a spreadsheet having a plurality of rows and a multiplicity of columns defining a set of cells of the spreadsheet,
   wherein one of the plurality of rows or the multiplicity of columns specifies a plurality of module instances to be generated based on the shared module template, and
   wherein the other one of the plurality of rows or the multiplicity of columns specifies the plurality of at least partially interconnected function blocks, so that each of the set of cells corresponds to a respective one of the plurality of module instances and a respective one of the plurality of at least partially interconnected function blocks.

7. The method of claim 1, wherein the shared module template specifies a plurality of types with which a certain at least partially interconnected function block from the set of selected one or more at least partially interconnected function blocks can be associated, the method further comprising:
   receiving a type selection for the certain at least partially interconnected function block,
   wherein the type selection identifies one of the plurality of types, and
   wherein generating a module instance from among the plurality of module instances further includes:
   instantiating the certain at least partially interconnected function block in accordance with the type selection.

8. The method of claim 7, wherein the plurality of types corresponds to at least one of a plurality of protocols, a plurality of alarm capabilities, or a plurality of signal options including a feedback option and a feedforward option.

9. The method of claim 7, further comprising:
receiving a modification request for the generated module instance,
wherein the modification request specifies the certain at least partially interconnected function block and a new type from the plurality of types; and
updating the generated module instance according to the modification request, including associating the certain at least partially interconnected function block with the new type.

10. The method of claim 1, further comprising:
providing a control to associate each of the plurality of at least partially interconnected function blocks with an optional attribute to specify an optional presence of each of the plurality of at least partially interconnected function blocks in a generated module instance from among the plurality of module instances.

11. The method of claim 1, wherein generating a module instance from among the plurality of module instances based on the shared module template further includes:
associating an options selected attribute with one of the plurality of module instances,
wherein the options selected attribute identifies each of the plurality of at least partially interconnected function blocks and specifies whether the identified at least partially interconnected function block is included in the generated one of the plurality of module instances.

12. The method of claim 11, wherein the options selected attribute is a bitmask.

13. The method of claim 1, further comprising:
providing an interface for modifying one of the plurality of module instances, including restricting modifications of the one of the plurality of module instances according to the set of selected one or more at least partially interconnected function blocks.

14. The method of claim 1, further comprising:
receiving a module instance identification request associated with the shared module template;
identifying each of the plurality of module instances associated with the process control strategy and based on the shared module template; and
displaying information on an interactive user interface descriptive of at least an identity of each module instance-from among the identified plurality of module instances.

15. The method of claim 14, further comprising:
receiving a modification request associated with one of a set of selected one or more optional at least partially interconnected function blocks; and
automatically applying the modification request to the one of the set of selected one or more optional at least partially interconnected function blocks for each of the identified plurality of module instances.

16. The method of claim 1, wherein generating a module instance from among the plurality of module instances further includes:
enabling collection of historical data associated with the set of selected one or more at least partially interconnected function blocks as designated by the plurality of selections received for each respective module instance.

17. The method of claim 1, wherein generating the a module instance from among the plurality of module instances further includes:
associating the module instance with a dynamo script, and wherein the dynamo script corresponds to at least the set of selected one or more at least partially interconnected function blocks as designated by the plurality of selections received for the module instance.

18. A process control configuration method in a computer system for developing a shared module template from among a plurality of shared module templates, the shared module template for use in configuring a process control strategy of a process plant, wherein the shared module template is stored as data on a non-transitory computer-readable medium, the method comprising:
providing a representation of the shared module template on an interactive user interface associated with the computer system,
wherein the shared module template has a plurality of at least partially interconnected function blocks which may be executed by a processor to implement a process control strategy for carrying out a process control operation;
associating, via the interactive user interface, each of the plurality of at least partially interconnected function blocks with one of (i) a mandatory attribute, or (ii) an optional attribute to; and
associating each of the plurality of at least partially interconnected function blocks having the mandatory attribute and the optional attribute with the shared module template,
wherein the shared module template is executable to generate at least one module instance as a set of instructions executable by one or more physical devices in the process plant,
wherein the at least one module instance includes each of the plurality of at least partially interconnected function blocks having the mandatory attribute and conditionally includes or excludes each of the plurality of at least partially interconnected function blocks having the optional attribute block based on a user input,
wherein the plurality of at least partially interconnected function blocks belong to a hierarchical control element structure lower than (i) a module instance, and (ii) the device within the process control system for which the plurality of at least partially interconnected function blocks facilitate control.

19. The method of claim 18, wherein providing the representation of the shared module template includes:
providing a plurality of structural components on a user interface screen,
wherein each of the plurality of structural components is associated with a predefined function;
receiving a selection of two or more of the plurality of structural components;
receiving component interaction information descriptive of an interaction between the selected two or more of the plurality of structural components;
receiving a set of parameters associated with the selected two or more of the plurality of structural components; and
associating the selected two or more of the plurality of structural components, the component interaction information, and the set of parameters with the shared module template.

20. The method of claim 18, further comprising:
receiving a shortcut name via the interactive user interface to a selected one or a selected group of the plurality of at least partially interconnected function blocks; and
associating the shortcut name with the selected one or a selected group of the plurality of at least partially interconnected function blocks.

21. The method of claim 18, further comprising:
receiving an indication of a plurality of types to be associated with the plurality of at least partially interconnected function blocks,
wherein exactly one of the plurality of types of the optional least partially interconnected function blocks is selectively included in, or excluded from, the module instance.

22. A process control configuration system stored as a set of instructions on a non-transitory computer readable medium and executable on a processor for configuring a process control system, comprising:
a user interface configured to develop a module instance that at least partially executes on a physical device within the process control system of a process plant to perform a control operation in the process control system, the user interface including:
an interface screen configured to present a shared module template from among a plurality of shared module templates, the shared module template having a plurality of at least partially interconnected function blocks that may be executed by a processor to implement a process control strategy, the shared module template including one or several structural components associated with control logic and one or several parameters,
wherein the plurality of at least partially interconnected function blocks includes a set of (i) mandatory function blocks having a mandatory attribute, and (ii) optional function blocks having an optional attribute; and
a user-operable control configured to receive a selection indicating which of the optional set of function blocks to be instantiated in a module instance; and
a module instantiating engine configured to generate a plurality of module instances based on the shared module template by instantiating the mandatory set of function blocks together with the optional set of function blocks as designated by the selections received for each respective module instance,
wherein the plurality of generated module instances are structurally distinct from one another based upon differences between their respective optional sets of function blocks,
wherein the plurality of at least partially interconnected function blocks belong to a hierarchical control element structure lower than (i) a module instance, and (ii) the physical device within the process control system for which the plurality of at least partially interconnected function blocks facilitate control.

23. The system of claim 22, further comprising:
a database to store the plurality of shared module templates.

24. The system of claim 22, wherein the one or several structural components are function blocks, each function block including:
one or several inputs, each adapted to receive a respective process control parameter;
one or several outputs; and
a control logic responsive to the one or several inputs to generate a control signal at the one or several outputs.

25. The system of claim 22, wherein the user interface is a first user interface, the system further comprising:
a second user interface configured to develop the shared module template, the second user interface including:
a first user-operable control configured to select the plurality of at least partially interconnected function blocks and to specify an interaction therebetween to define a control algorithm; and
a second user-operable control configured to associate the set of at least partially interconnected function blocks with the selected attribute as designated by the selections received for a respective module instance.

26. A process control configuration system stored as a set of instructions on a non-transitory computer readable medium and executable on a processor to develop a shared module template from among a plurality of shared module templates, wherein the shared module template is used in defining a process control strategy in a process plant; the system comprising:
an interactive screen configured to display a representation of the shared module template,
wherein the shared module template is stored as data on a non-transitory computer-readable medium and includes a plurality of at least partially interconnected function blocks which may be executed by a processor to implement the process control strategy and are associated with a respective logic operation and a multiplicity of parameters;
a first user-operable control configured to receive a selection of at least one of the plurality of at least partially interconnected function blocks;
a second user-operable control configured to associate the selected at least one of the plurality of at least partially interconnected function blocks with one of (i) a mandatory attribute, or (ii) an optional attribute; and
a template generation engine configured to generate the shared module template in accordance with the selection of the at least one of the plurality of at least partially interconnected function blocks that includes an attribute indication for each of the at least one of the plurality of at least partially interconnected function blocks,
wherein at least one module instance is generated as a set of instructions executable by one or more physical devices in the process plant based on the shared module template by instantiating the at least one module instance to include the mandatory set of function blocks and the optional set of function blocks as designated by a plurality of selections received for the at least one module instance,
wherein the plurality of at least partially interconnected function blocks belong to a hierarchical control element structure lower than (i) a module instance, and (ii) the physical device within the process control system for which the plurality of at least partially interconnected function blocks facilitate control.

27. The software system of claim 26, wherein first user-operable control is further configured to select a group of the plurality of at least partially interconnected function blocks having an optional attribute as an optional group having multiple ones of the plurality of at least partially interconnected function blocks, and
wherein the second user-operable control is further configured to associate the optional group with the optional attribute so that the entire optional group is included in, or excluded from, the at least one module instance in accordance with the user selection.

28. The software system of claim 27, further comprising:
a third user-operable control configured to receive a shortcut name and associate the shortcut name with the optional group.

29. The software system of claim 26, further comprising:
a third user-operable control configured to associate the at least one of the plurality of at least partially interconnected function blocks as designated by a plurality of selections received for the at least one module instance with a plurality of component types, and wherein the at least one module instance includes the selected at least one of the plurality of at least partially interconnected function blocks in accordance with the type selection.

30. A non-transitory computer-readable medium for generating a module instance based on a shared module template from among a plurality of shared module templates stored on the non-transitory computer-readable medium, wherein the module instance at least partially executes on a physical device operating in a process control system of a process plant, the shared module template comprising:

block data descriptive of a plurality of at least partially interconnected function blocks, wherein the at least partially interconnected function blocks are associated with a process control function and may be executed by a processor to implement a process control strategy;

connection data descriptive of logical connections between at least some of the plurality of at least partially interconnected function blocks;

parameter data descriptive of a multiplicity of process parameters associated with the plurality of at least partially interconnected function blocks;

attribute data, including a plurality of attribute indications for one or more of the plurality of at least partially interconnected function blocks that define (i) a mandatory set of function blocks having a mandatory attribute, and (ii) an optional set of function blocks having an optional attribute; and options data, including a plurality of optional at least partially interconnected block identifiers that includes an indication as to which of the optional set of function blocks is to be instantiated to generate the module instance based on a user selection, wherein, upon the module instance being executed by one or more processors, the mandatory set of function blocks are instantiated for each module instance generated from the shared module template regardless of the optional set of function blocks that are instantiated, wherein the plurality of at least partially interconnected function blocks belong to a hierarchical control element structure lower than (i) a module instance, and (ii) the physical device within the process control system for which the plurality of at least partially interconnected function blocks facilitate control.

31. The non-transitory computer-readable medium of claim 30, wherein the optional set of function blocks include a first and a second one of the plurality of at least partially interconnected function blocks, and wherein the first and second one of the plurality of at least partially interconnected function blocks define an optional component group.

32. The non-transitory computer-readable medium of claim 31, further comprising:

a group name associated with the optional component group.

33. The non-transitory computer-readable medium of claim 30, wherein the options data further includes a type selection field specifying a plurality of types associated with the optional set of function blocks.

34. A process control system to implement a process control strategy to control equipment that performs a physical function in a process plant, comprising:

a plurality of physical devices configured to implement the process control strategy, including a controller and a plurality of field devices to perform respective physical functions in the process plant;

a computer readable medium configured to store a shared module template as data associated with a plurality of at least partially interconnected function blocks which may be executed by a processor to implement the process control strategy and a multiplicity of parameters, wherein the shared module template is used to generate a plurality of module instances as sets of instructions executable on the plurality of physical devices, and wherein the plurality of at least partially interconnected function blocks are associated with one of (i) a mandatory attribute, or (ii) an optional attribute, and include an instantiation indication as to whether the at least partially interconnected function blocks having the optional attribute are to be instantiated;

a user interface executable on a processor configured to support user interaction with the shared module template; and a module instantiating engine configured to generate a module instance from among the plurality of module instances based on the shared module template by instantiating the module instance to include the at least partially interconnected function blocks having the mandatory attribute and the at least partially interconnected function blocks having the optional attribute in accordance with the instantiation indications associated with each of the at least partially interconnected function blocks such that the at least partially interconnected function blocks having the mandatory attribute are instantiated for each module instance generated from the shared module template regardless of the other at least partially interconnected function blocks set of function blocks having the optional attribute that are instantiated, wherein the plurality of at least partially interconnected function blocks belong to a hierarchical control element structure lower than (i) a module instance, and (ii) the physical device within the process control system for which the plurality of at least partially interconnected function blocks facilitate control.

35. The system of claim 34, wherein the user interface includes an interface screen to select one or more of the plurality of at least partially interconnected function blocks and to associate the selected one or more of the plurality of at least partially interconnected function blocks with the optional attribute.

36. The system of claim 34, wherein the module instantiating engine is further configured to collect historical data associated with the at least partially interconnected function blocks having the optional attribute if the at least partially interconnected function blocks having the optional attribute are selected in the generated module instance.

37. The method of claim 34, wherein the module instantiating engine associates the generated module instance with a dynamo script, and wherein the dynamo script corresponds to the at least partially interconnected function blocks having the optional attribute if the at least partially interconnected function blocks having the optional attribute are selected.

* * * * *